(12) United States Patent (10) Patent No.: US 12,513,494 B2
Li et al. (45) Date of Patent: Dec. 30, 2025

(54) DATA TRANSMISSION METHOD, APPARATUS, AND SYSTEM

(71) Applicant: Huawei Technologies Co., Ltd., Shenzhen (CN)

(72) Inventors: Meng Li, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 18/156,835

(22) Filed: Jan. 19, 2023

(65) Prior Publication Data

US 2023/0156436 A1 May 18, 2023

Related U.S. Application Data

(63) Continuation of application No. PCT/CN2021/008300, filed on Jul. 23, 2021.

(30) Foreign Application Priority Data

Jul. 23, 2020 (CN) .......................... 202010718875.0

(51) Int. Cl.
 *H04W 4/08* (2009.01)
 *H04W 8/18* (2009.01)
(52) U.S. Cl.
 CPC ............. *H04W 4/08* (2013.01); *H04W 8/186* (2013.01)
(58) Field of Classification Search
 CPC ................................. H04W 4/08; H04W 8/186
 See application file for complete search history.

(56) References Cited

U.S. PATENT DOCUMENTS

2018/0227842 A1 8/2018 Chandramouli et al.
2019/0223250 A1 7/2019 Dao et al.
(Continued)

FOREIGN PATENT DOCUMENTS

CN 105323722 A 2/2016
CN 108881356 A 11/2018
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Technical Specification, (Mar. 2020), 1048 Pages.

(Continued)

*Primary Examiner* — Joseph A Bednash
(74) *Attorney, Agent, or Firm* — Slater Matsil, LLP

(57) ABSTRACT

A data transmission method, an apparatus, and a system, the method including receiving, by a mobility management network element, second information from a session management network element, where the second information is associated with triggering establishment of a communication connection between a first terminal and a first access network device, and where the communication connection is associated with transmitting data of a first multicast service, and sending, by the mobility management network element, fifth information to the first access network device based on the second information, where sending the fifth information causes the first access network device to establish a communication connection to the first terminal according to the fifth information.

16 Claims, 11 Drawing Sheets

(56) References Cited

U.S. PATENT DOCUMENTS

| | | | |
|---|---|---|---|
| 2020/0045753 A1* | 2/2020 | Dao | .................. H04W 4/08 |
| 2020/0145280 A1 | 5/2020 | Cirik et al. | |

FOREIGN PATENT DOCUMENTS

| | | | |
|---|---|---|---|
| CN | 109219952 A | 1/2019 |
| CN | 109429364 A | 3/2019 |
| CN | 109661838 A | 4/2019 |
| CN | 110278584 A | 9/2019 |
| CN | 110662270 A | 1/2020 |
| CN | 110913505 A | 3/2020 |
| CN | 110913506 A | 3/2020 |
| CN | 111132239 A | 5/2020 |
| CN | 111436087 A | 7/2020 |
| EP | 3471503 A1 | 4/2019 |
| JP | 2019512972 A | 5/2019 |

OTHER PUBLICATIONS

"3rd Generation Partnership Project; Technical Specification Group Radio Access Network; NR; NR and NG-RAN Overall Description; Stage 2 (Release 16)", 3GPP TS 38.300 V16.1.0, Technical Specification, (Mar. 2020), 133 Pages.

"3rd Generation Partnership Project; Technical Specification Group Core Network and Terminals; Interface between the Control Plane and the User Plane Nodes; Stage 3 (Release 16)", 3GPP TS 29.244 V16.4.0 Technical Specification, (Jun. 2020), 310 Pages.

"3rd Generation Partnership Project; Technical Specification Group Radio Access Network; NR; User Equipment (UE) procedures in Idle mode and RRC Inactive state (Release 16)", 3GPP TS 38.304 V16.0.0, Technical Specification, (Mar. 2020), 38 Pages.

"3rd Generation Partnership Project; Technical Specification Group Services and System Aspects;System architecture for the 5G System (5GS); Stage 2 (Release 16)", 3GPP TS 23.501 V16.5.0, Technical Specification, (Jul. 2020), 441 Pages.

"3rd Generation Partnership Project; Technical Specification Group Radio Access Network; NG-RAN; NG Application Protocol (NGAP) (Release 16)", 3GPP TS 38.413 V16.2.0, Technical Specification, (Jul. 2020), 462 Pages.

"3rd Generation Partnership Project; Technical Specification Group Services and System Aspects; Procedures for the 5G System (5GS); Stage 2 (Release 16)", 3GPP TS 23.502 V16.5.0, Technical Specification, (Jul. 2020), 594 Pages.

"3rd Generation Partnership Project; Technical Specification Group Core Network and Terminals; Non-Access-Stratum (NAS) protocol for 5G System (5GS); Stage 3; (Release 16)", 3GPP TS 24.501 V16.5.1, Technical Specification, (Jul. 2020), 709 Pages.

"3rd Generation Partnership Project; Technical Specification Group Core Network and Terminals; Non-Access-Stratum (NAS) functions related to Mobile Station (MS) in idle mode (Release 16)", 3GPP TS 23.122 V16.6.1, Technical Specification, (Jul. 2020), 81 Pages.

"3rd Generation Partnership Project; Technical Specification Group Radio Access Network; NR; Radio Resource Control (RRC) protocol specification (Release 16)", 3GPP TS 38.331 V16.0.0, Technical Specification, (Mar. 2020), 835 Pages.

* cited by examiner

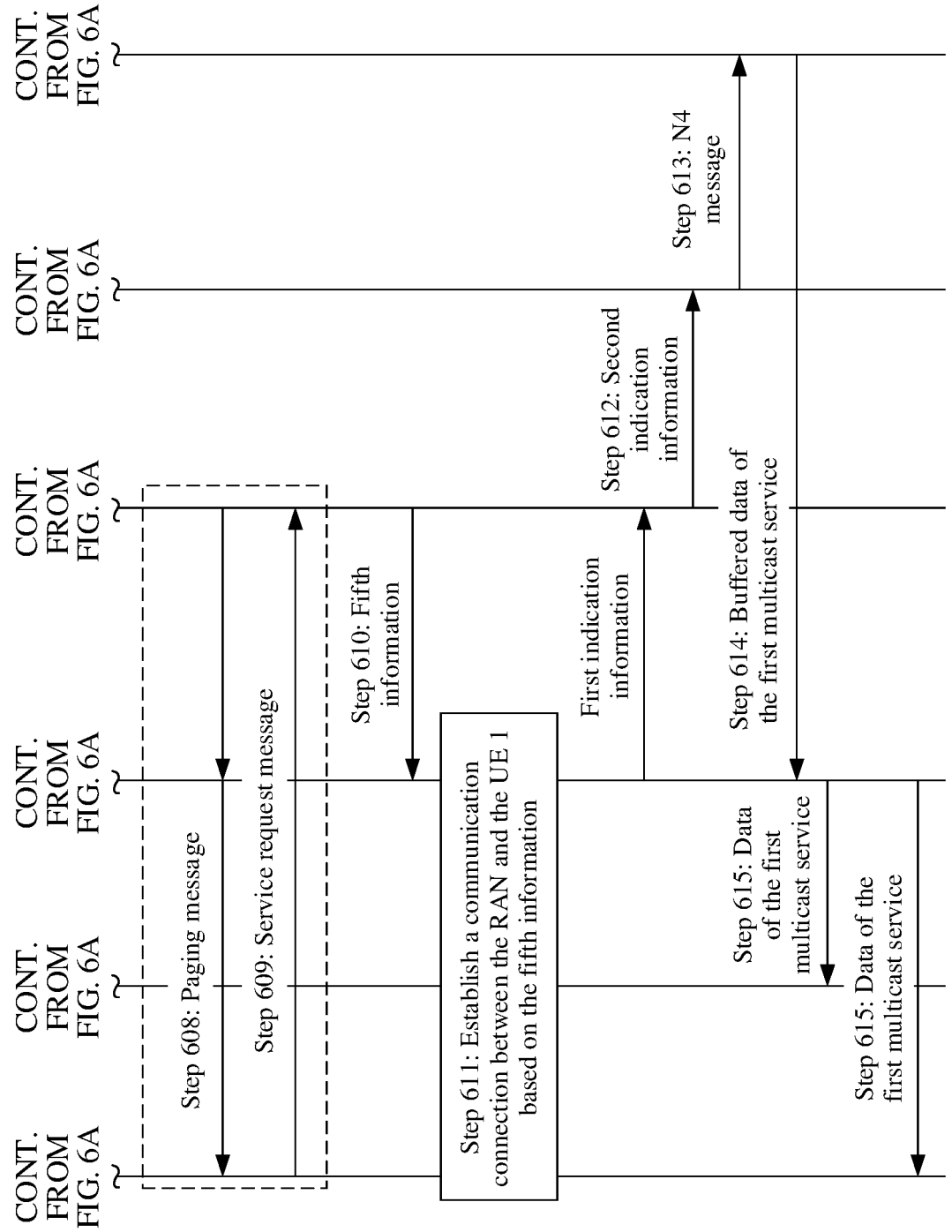

DATA TRANSMISSION METHOD, APPARATUS, AND SYSTEM

CROSS-REFERENCE TO RELATED APPLICATIONS

This application is a continuation of International Application No. PCT/CN2021/108300, filed on Jul. 23, 2021, which claims priority to Chinese Patent Application No. 202010718875.0, filed on Jul. 23, 2020. The disclosures of the aforementioned applications are hereby incorporated by reference in their entireties.

TECHNICAL FIELD

Embodiments of this application relate to the field of communication technologies, and in particular, to a data transmission method, an apparatus, and a system.

BACKGROUND

In a 3rd generation partnership project (3GPP) network, there is a requirement that a network side device sends multicast service data to a plurality of terminals (for example, terminals in a multicast group) through a same communication connection, that is, a point-to-multipoint data transmission requirement.

To meet this requirement, in a conventional technology, multicast service data sent to a plurality of terminals shares a same user plane function (UPF) and a downlink tunnel between the UPF and an access network device. The downlink tunnel may be any downlink tunnel in a plurality of downlink tunnels corresponding to the plurality of terminals, and downlink tunnel information for identifying the downlink tunnel is stored in the UPF. After an application server sends the multicast service data to the UPF, the UPF may send the multicast service data to the access network device through the downlink tunnel based on the locally stored downlink tunnel information, and the access network device sends the multicast service data to the plurality of terminals.

However, in a communication process, a terminal may be in a connected state, an idle state, or an inactive state. When a terminal that has a multicast service requirement is in an idle state or an inactive state, a communication connection between the terminal and an access network device is disconnected, and the terminal cannot receive multicast service data sent by the access network device. Consequently, it cannot be ensured that all terminals in a multicast group receive the multicast service data.

SUMMARY

Embodiments of this application provide a data transmission method, an apparatus, and a system, to resolve a problem that a terminal in an idle state or an inactive state cannot receive multicast service data.

To achieve the foregoing objective, the following technical solutions are used in embodiments of this application.

According to a first aspect of embodiments of this application, a data transmission method is provided. The method includes sending, by a session management network element, first information to a user plane network element when there is at least one terminal in a preset state in a multicast group corresponding to a first multicast service, where the first information is used by the user plane network element to send notification information to the session management network element when data of the first multicast service arrives at the user plane network element, receiving, by the session management network element, the notification information from the user plane network element, where the notification information indicates that the data of the first multicast service arrives at the user plane network element, and sending second information to a mobility management network element based on the notification information, where the second information is for triggering establishment of a communication connection between a first terminal and a first access network device, and the first terminal belongs to the at least one terminal in the preset state.

The preset state includes an idle state, an inactive state, or a state in which no communication connection to an access network device exists for transmitting the data of the first multicast service.

Based on the method according to the first aspect, the session management network element may send the first information to the user plane network element when there is at least one terminal in the preset state in the multicast group corresponding to the multicast service, to indicate the user plane network element to send the notification information to the session management network element when the data of the first multicast service arrives at the user plane network element, and subsequently trigger establishment of a communication connection between the terminal in the preset state and an access network device after the data of the first multicast service arrives at the user plane network element. In this way, after establishment of the communication connection is completed, the data of the first multicast service is sent to the terminal in the multicast group through the communication connection between the access network device and the terminal. This avoids a problem that because the terminal is in the preset state, the terminal cannot receive the multicast service data when the communication connection between the terminal and the access network device for transmitting the multicast service data is disconnected, and ensures that all terminals in the multicast group can receive the multicast service data without loss.

In a possible design, for another terminal belonging to the at least one terminal in the preset state, for example, a second terminal, the second information is further for triggering establishment of a communication connection between the second terminal and a second access network device. Based on the possible design, establishment of communication connections between a plurality of terminals and the access network device may be triggered by using one piece of information, to reduce signaling overheads.

In a possible design, the first information includes first identification information for identifying the data of the first multicast service. Based on this possible design, the identification information indicating the data of the first multicast service is carried in the first information, to explicitly indicate the user plane network element to send the notification information to the session management network element when the data of the first multicast service arrives at the user plane network element, and the user plane network element does not need to indirectly determine, based on the first information, to send the notification information to the session management network element. This simplifies a system design.

In a possible design, the method further includes sending, by the session management network element, third information to the user plane network element when all terminals in the multicast group corresponding to the first multicast service have communication connections to an access network device, where the third information is for notifying the user plane network element to send the data of the first multicast service. This ensures that all the terminals in the multicast group receive the multicast service data without loss.

In a possible design, the method further includes sending, by the session management network element, third information to the user plane network element when all terminals in the at least one terminal in the preset state have communication connections to an access network device, where the third information is for notifying the user plane network element to send the data of the first multicast service. This ensures at least that when establishment of the communication connections between all the terminals in the preset state and the access network device is completed, the multicast service data is received through the communication connections.

In a possible design, after the sending second information to a mobility management network element, the method further includes sending, by the session management network element, third information to the user plane network element based on first preset waiting duration, where the third information is for notifying the user plane network element to send the data of the first multicast service. Based on the possible design, waiting duration may be designed in advance for the session management network element to send the third information to the user plane network element. After the waiting duration expires, the third information is sent to the user plane network element. This simplifies a system design.

In a possible design, the third information includes second identification information for identifying the data of the first multicast service. Based on the possible design, the identification information for identifying the data of the first multicast service is carried in the third information, and is explicitly indicated to the user plane network element, so that the user plane network element directly learns of the to-be-sent data of the first multicast service based on the identification information, and the user plane network element does not need to indirectly determine the to-be-sent data of the first multicast service. This simplifies design complexity of the user plane network element.

In a possible design, the method further includes receiving, by the session management network element, fourth information that is from the mobility management network element and that is for deactivating a user-plane transmission resource of the first terminal, and determining, based on the fourth information, that the first terminal is in the preset state. Based on the possible design, when a terminal is in the preset state, the information for deactivating the user-plane transmission resource may be further sent to the session management network element, so that the session management network element learns that the terminal corresponding to the user-plane transmission resource is in the preset state. This simplifies a system design.

According to a second aspect, this application provides a communication apparatus. The communication apparatus may be a session management network element, or a chip or a system-on-a-chip in the session management network element. The communication apparatus may implement a function performed by the communication apparatus according to the first aspect or the possible designs of the first aspect. The function may be implemented by hardware, or may be implemented by hardware executing corresponding software. The hardware or the software includes one or more modules corresponding to the function. For example, the communication apparatus may include a sending unit and a receiving unit.

The sending unit is configured to send first information to a user plane network element when there is at least one terminal in a preset state in a multicast group corresponding to a first multicast service, where the first information is used by the user plane network element to send notification information to a session management network element when data of the first multicast service arrives at the user plane network element.

The receiving unit is configured to receive the notification information from the user plane network element, where the notification information indicates that the data of the first multicast service arrives at the user plane network element.

The sending unit is further configured to send second information to a mobility management network element based on the notification information, where the second information is for triggering establishment of a communication connection between a first terminal and a first access network device, and the first terminal belongs to the at least one terminal in the preset state.

The preset state includes an idle state, an inactive state, or a state in which no communication connection to an access network device exists for transmitting the data of the first multicast service. For a specific implementation of each unit of the communication apparatus, refer to behavior functions of the session management network element in the data transmission method according to any one of the first aspect or the possible designs of the first aspect. Details are not described herein again. The provided communication apparatus can achieve same beneficial effects as any one of the first aspect or the possible designs of the first aspect.

According to a third aspect, a communication apparatus is provided, and includes a processor and a memory. The memory is configured to store computer-executable instructions, and when the communication apparatus runs, the processor executes the computer-executable instructions stored in the memory, so that the communication apparatus performs the data transmission method according to any one of the first aspect or the possible designs of the first aspect.

According to a fourth aspect, a computer-readable storage medium is provided. The computer-readable storage medium stores instructions, and when the instructions are run on a computer, the computer is enabled to perform the data transmission method according to any one of the first aspect or the possible designs thereof.

According to a fifth aspect, a computer program product including instructions is provided. When the computer program product runs on a computer, the computer is enabled to perform the data transmission method according to any one of the first aspect or the possible designs thereof.

According to a sixth aspect, a communication apparatus is provided. The communication apparatus may be a chip system, and the chip system may include a processor and a communication interface, configured to support the communication apparatus in implementing the functions according to any one of the first aspect or the possible designs of the first aspect. For example, the processor sends, through the communication interface, first information to a user plane network element when there is at least one terminal in a preset state in a multicast group corresponding to a first multicast service, where the first information is used by the user plane network element to send notification information to a session management network element when data of the first multicast service arrives at the user plane network element, receives the notification information from the user plane network element, where the notification information indicates that the data of the first multicast service arrives at the user plane network element, and sends second information to a mobility management network element based on the notification information, where the second information is for triggering establishment of a communication connection between a first terminal and a first access network device, and the first terminal belongs to the at least one terminal in the preset state. In a possible design, the chip system further includes a memory. The memory is configured to store program instructions and data that are necessary for the communication apparatus. The chip system may include a chip, or may include a chip and another discrete component.

For technical effects achieved by any one of the designs of the third aspect to the sixth aspect, refer to the technical effects achieved by any one of the first aspect or the possible designs of the first aspect. Details are not described again.

According to a seventh aspect, an embodiment of this application provides another data transmission method. The method may include receiving, by a user plane network element, first information from a session management network element, where the first information is used by the user plane network element to send notification information to the session management network element when data of a first multicast service arrives at the user plane network element, and sending, after receiving the data of the first multicast service, the notification information to the session management network element based on the first information, where the notification information indicates that the data of the first multicast service arrives at the user plane network element. In this way, after receiving the notification message, the session management network element triggers establishment of a communication connection between a terminal in a preset state and an access network device. This ensures that the terminal in the preset state receives the data of the first multicast service through the communication connection without loss.

Based on the method according to the seventh aspect, when there is at least one terminal in the preset state in a multicast group corresponding to a multicast service, the user plane network element may notify, under an indication of the session management network element, the session management network element when the data arrives at the user plane network element, so that the session management network element triggers establishment of the communication connection between the terminal in the preset state and the access network device. In this way, after establishment of the communication connection is completed, the data of the first multicast service is sent to the terminal in the multicast group through the communication connection between the access network device and the terminal. This avoids a problem that because the terminal is in the preset state, the terminal cannot receive the multicast service data when the communication connection between the terminal and the access network device for transmitting the multicast service data is disconnected, and ensures that all terminals in the multicast group can receive the multicast service data without loss.

In a possible design, the method further includes after receiving the data of the first multicast service, the user plane network element buffers the data of the first multicast service, so that the buffered data of the first multicast service is sent subsequently after establishment of the communication connection is completed. In this way, when the data of the first multicast service arrives at the user plane network element, the data is stored through buffering, to avoid a problem that the terminal in the preset state misses (or cannot receive) the data of the first multicast service delivered in this time period.

In a possible design, the first information includes first identification information for identifying the data of the first multicast service. In other words, the user plane network element is explicitly indicated, by using the identification information, to monitor whether the data of the first multicast service arrives, and notify the session management network element when the data of the first multicast service arrives. This simplifies a system design.

In a possible design, the method further includes receiving, by the user plane network element from the session management network element, third information for notifying the user plane network element to send the data of the first multicast service, and sending the data of the first multicast service based on the third information. In other words, after establishment of the communication connection is completed, the user plane network element delivers the multicast service data when the session management network element notifies the user plane network element to deliver the data of the first multicast service, to avoid a failure in sending the multicast service data.

In a possible design, the third information includes second identification information for identifying the data of the first multicast service. In other words, the user plane network element is explicitly indicated, by using the identification information, to deliver the data of the first multicast service. This simplifies a system design.

According to an eighth aspect, a communication apparatus is provided. The communication apparatus may be a user plane network element, or a chip or a system-on-a-chip in the user plane network element. The communication apparatus may implement a function performed by the user plane network element according to the seventh aspect or the possible designs of the seventh aspect. The function may be implemented by hardware, or may be implemented by hardware executing corresponding software. The hardware or the software includes one or more modules corresponding to the function. For example, the communication apparatus may include a receiving unit and a sending unit.

The receiving unit is configured to receive first information from a session management network element, where the first information is used by the user plane network element to send notification information to the session management network element when data of a first multicast service arrives at the user plane network element, and receive the data of the first multicast service.

The sending unit is configured to send the notification information to the session management network element based on the first information, where the notification information indicates that the data of the first multicast service arrives at the user plane network element.

For a specific implementation of the communication apparatus, refer to behavior functions of the user plane network element in the data transmission method according to any one of the seventh aspect or the possible designs of the seventh aspect. Any one of the seventh aspect or the possible designs of the seventh aspect may be correspondingly implemented by the receiving unit and the sending unit included in the communication apparatus.

According to a ninth aspect, a communication apparatus is provided, and includes a processor and a memory. The memory is configured to store computer-executable instructions, and when the communication apparatus runs, the processor executes the computer-executable instructions stored in the memory, so that the communication apparatus performs the data transmission method according to any one of the seventh aspect or the possible designs of the seventh aspect.

According to a tenth aspect, a computer-readable storage medium is provided. The computer-readable storage medium stores instructions, and when the instructions are run on a computer, the computer is enabled to perform the data transmission method according to any one of the seventh aspect or the possible designs thereof.

According to an eleventh aspect, a computer program product including instructions is provided. When the computer program product runs on a computer, the computer is enabled to perform the data transmission method according to any one of the seventh aspect or the possible designs thereof.

According to a twelfth aspect, a chip system is provided. The chip system includes a processor and a communication interface, configured to support a communication apparatus in implementing functions in the foregoing aspects. For example, the processor receives, through the communication interface, first information from a session management network element, where the first information is used by a user plane network element to send notification information to the session management network element when data of a first multicast service arrives at the user plane network element, receives the data of the first multicast service, and sends the notification information to the session management network element based on the first information, where the notification information indicates that the data of the first multicast service arrives at the user plane network element. In a possible design, the chip system further includes a memory. The memory is configured to store program instructions and data that are necessary for the communication apparatus. The chip system may include a chip, or may include a chip and another discrete component.

For technical effects achieved by any one of the designs of the ninth aspect to the twelfth aspect, refer to the technical effects achieved by any one of the seventh aspect or the possible designs of the seventh aspect. Details are not described again.

According to a thirteenth aspect, a data transmission method is further provided. The method includes receiving, by a mobility management network element, second information from a session management network element, where the second information is for triggering establishment of a communication connection between a first terminal and a first access network device, and sending fifth information to the first access network device based on the second information, where the fifth information is used by the first access network device to establish a communication connection to the first terminal. Based on the method according to the thirteenth aspect, the mobility management network element may send the second information to the first access network device when triggered by the session management network element, so that the first access network device establishes the communication connection between the first access network device and the first terminal, and the first access network device sends the data of the first multicast service to the first terminal through the communication connection. This ensures that the first terminal receives the data of the first multicast service without loss.

In a possible design, the mobility management network element receives first indication information from the first access network device, where the first indication information indicates that establishment of the communication connection between the first terminal and the first access network device is completed, and sends second indication information to the session management network element based on the first indication information, where the second indication information indicates that establishment of the communication connection between the first terminal and the first access network device is completed. In other words, the mobility management network element sends indication information to the session management network element when receiving communication connection establishment completion information sent by an access network device, so that the session management network element learns of specific terminals in a multicast group whose communication connections have been established. This simplifies a system design.

In a possible design, the second information is further for triggering establishment of a communication connection between a second terminal and a second access network device, and the method further includes the mobility management network element sends sixth information to the second access network device based on the second information, where the sixth information is used by the second access network device to establish the communication connection to the second terminal. In other words, establishment of a plurality of communication connections is triggered by using one piece of second information, to reduce signaling overheads.

In a possible design, the method further includes the mobility management network element receives third indication information from the second access network device, where the third indication information indicates that establishment of the communication connection between the second terminal and the second access network device is completed, and sends fourth indication information to the session management network element based on the third indication information, where the fourth indication information indicates that establishment of the communication connection between the second terminal and the second access network device is completed. Similarly, for a communication connection establishment completion indication sent by another access network device, the mobility management network element sends indication information to the session management network element immediately after receiving the communication connection establishment completion indication sent by the access network device, so that the session management network element learns of specific terminals in the multicast group whose communication connections have been established. This simplifies a system design.

In a possible design, the mobility management network element sends fifth indication information to the session management network element based on second preset waiting duration, where the fifth indication information indicates that establishment of all communication connections that the session management network element triggers the mobility management network element to establish is completed. To be specific, preset waiting duration is set for the mobility management network element. When the preset waiting duration expires, the session management network element is notified that establishment of a communication connection is completed, to ensure that establishment of as many communication connections as possible is completed within the preset waiting duration. This avoids a problem that because communication connection establishment speeds of different terminals served by different access network devices are different, when an access network device that first completes establishment of a communication connection triggers data delivery of a multicast service, a packet loss of a terminal served by another access network device with slow communication connection establishment is caused.

In a possible design, when the first terminal is in an idle state, before the sending, by the mobility management network element, fifth information to the first access network device, the method further includes sending, by the mobility management network element, a paging message to the first access network device, where the paging message is for paging the first terminal, and receiving, by the mobility management network element, a service request message from the first terminal. In other words, when a terminal is in a connection management (CM) connected state, the fifth information for communication connection establishment is sent to the access network device. This ensures accuracy of communication connection establishment.

It should be understood that, to reduce signaling overheads, after receiving the notification information indicating that the user plane network element receives the data of the first multicast service, the session management network element may indicate, to the mobility management network element by using a signaling message, a terminal that joins the multicast group, so that the mobility management network element pages the terminal in the idle state to receive the data of the first multicast service. Specifically, the mobility management network element receives a user equipment (UE) list of the multicast group from the session management network element, where the multicast group corresponds to the first multicast service, and the UE list indicates a terminal that joins the multicast group, and the mobility management network element determines a terminal in an idle state in the terminal indicated by the UE list, and sends a paging message to the terminal in the idle state. In other words, paging of a plurality of terminals is triggered by using one signaling message, to reduce signaling overheads.

In a possible design, the UE list is carried in the second information, and the second information may further include identification information of the multicast group. In this way, the mobility management network element learns of a specific multicast group in which a terminal is paged. A paging message carrying the identification information of the multicast group is sent to the terminal in the idle state. In this way, when receiving the paging message carrying the identification information of the multicast group, the terminal in the idle state may learn whether the terminal needs to initiate a service request procedure.

In a possible design, the terminal in the idle state includes the first terminal and the second terminal, and the sending, by the mobility management network element, a paging message to the terminal in the idle state includes sending, by the mobility management network element, a paging message in a first paging area, where the paging message includes the identification information of the multicast group, and the first paging area includes a registration area of the first terminal and a registration area of the second terminal. In this way, a plurality of terminals can be paged in a group paging manner, to reduce paging signaling overheads.

In a possible design, the method further includes receiving, by the mobility management network element, a service request message from the first terminal, and/or receiving, by the mobility management network element, a service request message from the second terminal.

In a possible design, the first paging area further includes a registration area of a terminal other than the first terminal and the second terminal in the UE list. Alternatively, the first paging area further includes a registration area of a terminal in an idle state other than the first terminal and the second terminal in the UE list. In this way, group paging can be initiated in registration areas of more terminals, so that more terminals are paged to receive the data of the first multicast service.

According to a fourteenth aspect, this application provides a communication apparatus. The communication apparatus may be a mobility management network element, or a chip or a system-on-a-chip in the mobility management network element. The communication apparatus may implement a function performed by the mobility management network element according to any one of the thirteenth aspect or the possible designs of the thirteenth aspect. The function may be implemented by hardware, or may be implemented by hardware executing corresponding software. The hardware or the software includes one or more modules corresponding to the function. For example, the communication apparatus may include a receiving unit, a sending unit, and a processing unit.

In a possible design, the receiving unit is configured to receive second information from a session management network element, where the second information is for triggering establishment of a communication connection between a first terminal and a first access network device, and the communication connection is for transmitting data of a first multicast service.

The sending unit is configured to send fifth information to the first access network device based on the second information, where the fifth information is used by the first access network device to establish the communication connection to the first terminal.

In another possible design, the receiving unit is configured to receive a user equipment list UE list of a multicast group from the session management network element, where the multicast group corresponds to the first multicast service, and the UE list indicates a terminal that joins the multicast group. The processing unit is configured to determine a terminal in an idle state in the terminal indicated by the UE list. The sending unit is configured to send a paging message to the terminal in the idle state.

For a specific implementation of the communication apparatus, refer to behavior functions of the mobility management network element in the data transmission method according to any one of the thirteenth aspect or the possible designs of the thirteenth aspect. The method according to any one of the thirteenth aspect or the possible designs of the thirteenth aspect may be correspondingly implemented by an obtaining unit and the sending unit included in the communication apparatus.

According to a fifteenth aspect, a communication apparatus is provided, and includes a processor and a memory. The memory is configured to store computer executable instructions, and when the communication apparatus runs, the processor executes the computer executable instructions stored in the memory, so that the communication apparatus performs the data transmission method according to any one of the thirteenth aspect or the possible designs of the thirteenth aspect.

According to a sixteenth aspect, a computer-readable storage medium is provided. The computer-readable storage medium stores instructions, and when the instructions are run on a computer, the computer is enabled to perform the data transmission method according to any one of the thirteenth aspect or the possible designs thereof.

According to a seventeenth aspect, a computer program product including instructions is provided. When the computer program product runs on a computer, the computer is enabled to perform the data transmission method according to any one of the thirteenth aspect or the possible designs thereof.

According to an eighteenth aspect, a chip system is provided. The chip system includes a processor and a communication interface, configured to support a communication apparatus in implementing functions in the foregoing aspects. For example, the processor receives, through the communication interface, second information from a session management network element, where the second information is for triggering establishment of a communication connection between a first terminal and a first access network device, and sends fifth information to the first access network device based on the second information, where the fifth information is used by the first access network device to establish a communication connection to the first terminal. In a possible design, the chip system further includes a memory. The memory is configured to store program instructions and data that are necessary for the communication apparatus. The chip system may include a chip, or may include a chip and another discrete component.

For technical effects achieved by any one of the fifteenth aspect to the eighteenth aspect, refer to the technical effect achieved by any one of the thirteenth aspect or the possible designs of the thirteenth aspect. Details are not described again.

According to a nineteenth aspect, a data transmission method is further provided. The method includes receiving, by a first access network device, data of a first multicast service, buffering, by the first access network device, the data of the first multicast service when there is at least one terminal that is served by the first access network device and that is in a preset state in a multicast group corresponding to the first multicast service, and sending a paging message for paging a first terminal, where the first terminal belongs to the at least one terminal that is served by the first access network device and that is in the preset state, and the preset state includes an idle state, an inactive state, or a state in which no communication connection to an access network device exists for transmitting the data of the first multicast service.

Based on the method according to the nineteenth aspect, when a terminal served by the first access network device is in a non-connected state, the first access network device first buffers the received data of the first multicast service, and initiates paging to the terminal, so that multicast service data is delivered when the terminal is paged and transits to a connected state. This ensures that the terminal receives the multicast service data without loss.

In a possible design, the method further includes receiving, by the first access network device, a first radio resource control (RRC) message from the first terminal, where the first RRC message requests to establish a communication connection between the first terminal and the first access network device, obtaining fifth information from a mobility management network element based on the first RRC message, where the fifth information is for establishing the communication connection between the first terminal and the first access network device, and sending seventh information to the first terminal based on the fifth information, where the seventh information indicates a related configuration of the communication connection between the first terminal and the first access network device. In other words, the fifth information is obtained when a request for establishing the communication connection is received from the first terminal, air interface resource configuration and the like is performed for the terminal based on the fifth information, and the configuration is indicated to the terminal. This simplifies a system design when establishment of the communication connection is completed.

In a possible design, the method further includes sending, by the first access network device, the buffered data of the first multicast service when there is no terminal that is served by the first access network device and that is in the preset state in the multicast group corresponding to the first multicast service, or sending, by the first access network device, the buffered data of the first multicast service based on third preset waiting duration. In other words, the buffered multicast service data is sent when communication connections corresponding to all terminals served by the first access network device are completed or when the preset waiting duration expires. This ensures that as many terminals receive the multicast service data as possible.

In a possible design, the first RRC message is a service request message or an RRC resume request message. In other words, the foregoing application scenario is applied when the first terminal is in an idle state or a non-connected state. Application scenarios are flexible and diversified, and adaptability is good.

In a possible design, the sending, by the first access network device, a paging message to a first terminal includes sending, by the first access network device, the paging message to the first terminal on a first channel, where the first channel includes any one of a unicast channel between the first access network device and the first terminal, a common channel, or a dedicated channel of the multicast group corresponding to the first multicast service. In other words, the paging message may be sent on any one of a plurality of channels. This is flexible and has good adaptability.

According to a twentieth aspect, this application provides a communication apparatus. The communication apparatus may be a first access network device, or a chip or a system-on-a-chip in the first access network device. The communication apparatus may implement a function performed by the first access network device according to any one of the nineteenth aspect or the possible designs of the nineteenth aspect. The function may be implemented by hardware, or may be implemented by hardware executing corresponding software. The hardware or the software includes one or more modules corresponding to the function. For example, the communication apparatus may include a receiving unit, a processing unit, and a sending unit.

The receiving unit is configured to receive data of a first multicast service.

The processing unit is configured to buffer the data of the first multicast service when there is at least one terminal that is in a preset state and that is served by a first access network device in a multicast group corresponding to the first multicast service.

The sending unit is configured to send a paging message for paging a first terminal, where the first terminal belongs to the at least one terminal that is in the preset state and that is served by the first access network device.

For a specific implementation of the communication apparatus, refer to behavior functions of the first access network device in the data transmission method according to any one of the nineteenth aspect or the possible designs of the nineteenth aspect. The method according to any one of the nineteenth aspect or the possible designs of the nineteenth aspect may be correspondingly implemented by an obtaining unit and the sending unit included in the communication apparatus.

According to a twenty-first aspect, a communication apparatus is provided, and includes a processor and a memory. The memory is configured to store computer executable instructions, and when the communication apparatus runs, the processor executes the computer executable instructions stored in the memory, so that the communication apparatus performs the data transmission method according to any one of the nineteenth aspect or the possible designs of the nineteenth aspect.

According to a twenty-second aspect, a computer-readable storage medium is provided. The computer-readable storage medium stores instructions, and when the instructions are run on a computer, the computer is enabled to perform the data transmission method according to any one of the nineteenth aspect or the possible designs thereof.

According to a twenty-third aspect, a computer program product including instructions is provided. When the computer program product runs on a computer, the computer is enabled to perform the data transmission method according to any one of the nineteenth aspect or the possible designs thereof.

According to a twenty-fourth aspect, a chip system is provided. The chip system includes a processor and a communication interface, configured to support a communication apparatus in implementing functions in the foregoing aspects. For example, the processor receives data of a first multicast service through a communication interface, buffers the data of the first multicast service when there is at least one terminal that is in a preset state and that is served by a first access network device in a multicast group corresponding to the first multicast service, and sends a paging message for paging a first terminal, where the first terminal belongs to the at least one terminal that is in the preset state and that is served by the first access network device. In a possible design, the chip system further includes a memory. The memory is configured to store program instructions and data that are necessary for the communication apparatus. The chip system may include a chip, or may include a chip and another discrete component.

For technical effects achieved by any one of the designs of the twenty-first aspect to the twenty-fourth aspect, refer to technical effects achieved by any one of the nineteenth aspect or the possible designs of the nineteenth aspect. Details are not described again.

According to a twenty-fifth aspect of embodiments of this application, a data transmission method is provided. The method includes receiving, by a session management network element, fourth information from a mobility management network element, where the fourth information is for deactivating a user-plane transmission resource of a first terminal, and sending second information to the mobility management network element based on the fourth information, where the second information is for establishing a communication connection between the first terminal and a first access network device. In other words, when the user plane resource of the first terminal is deactivated, the second information for establishing the communication connection is sent to the mobility management network element, so that the mobility management network element configures an air interface resource for the terminal based on the second information. This ensures that the terminal receives multicast service data without loss based on the air interface resource configured for the terminal.

In a possible design, the sending, by the session management network element, second information to the mobility management network element includes sending, by the session management network element, a subscription request to the mobility management network element, where the subscription request is for requesting to subscribe to a first event, and the first event is that the first terminal transits from a preset state to a connected state, receiving, by the session management network element, event notification information from the mobility management network element, where the event notification information is for notifying the first event, and sending, by the session management network element, the second information to the mobility management network element based on the event notification information. In other words, the second information is sent through a subscription process. This simplifies a system design.

According to a twenty-sixth aspect, this application provides a communication apparatus. The communication apparatus may be a session management network element, or a chip or a system-on-a-chip in the session management network element. The communication apparatus may implement a function performed by the communication apparatus according to the twenty-fifth aspect or the possible designs of the twenty-fifth aspect. The function may be implemented by hardware, or may be implemented by hardware executing corresponding software. The hardware or the software includes one or more modules corresponding to the function. For example, the communication apparatus may include a receiving unit and a sending unit.

The receiving unit is configured to receive fourth information that is from the mobility management network element and that is for deactivating a user-plane transmission resource of the first terminal.

The sending unit is configured to send second information to the mobility management network element based on the fourth information, where the second information is for establishing a communication connection between the first terminal and a first access network device.

For a specific implementation of each unit of the communication apparatus, refer to behavior functions of the session management network element in the data transmission method according to any one of the twenty-fifth aspect or the possible designs of the twenty-fifth aspect. Details are not described herein again. The provided communication apparatus can achieve same beneficial effects as any one of the twenty-fifth aspect or the possible designs of the twenty-fifth aspect.

According to a twenty-seventh aspect, a communication apparatus is provided, and includes a processor and a memory. The memory is configured to store computer-executable instructions. When the communication apparatus runs, the processor executes the computer-executable instructions stored in the memory, so that the communication apparatus performs the data transmission method according to any one of the twenty-fifth aspect or the possible designs of the twenty-fifth aspect.

According to a twenty-eighth aspect, a computer-readable storage medium is provided. The computer-readable storage medium stores instructions, and when the instructions are run on a computer, the computer is enabled to perform the data transmission method according to any one of the twenty-fifth aspect or the possible designs thereof.

According to a twenty-ninth aspect, a computer program product including instructions is provided. When the computer program product runs on a computer, the computer is enabled to perform the data transmission method according to any one of the twenty-fifth aspect or the possible designs thereof.

According to a thirtieth aspect, a communication apparatus is provided. The communication apparatus may be a chip system, and the chip system may include a processor and a communication interface, configured to support the communication apparatus in implementing the functions according to any one of the twenty-fifth aspect or the possible designs of the twenty-fifth aspect. For example, the processor receives, through the communication interface, fourth information that is from a mobility management network element and that is for deactivating a user-plane transmission resource of a first terminal, and sends second information to the mobility management network element based on the fourth information, where the second information is for establishing a communication connection between the first terminal and a first access network device. In a possible design, the chip system further includes a memory. The memory is configured to store program instructions and data that are necessary for the communication apparatus. The chip system may include a chip, or may include a chip and another discrete component.

For technical effects achieved by any one of the designs of the twenty-seventh aspect to the thirtieth aspect, refer to the technical effects achieved by any one of the twenty-fifth aspect or the possible designs of the twenty-fifth aspect. Details are not described again.

According to a thirty-first aspect, a communication system is provided. The communication system may include the communication apparatus or the chip system according to any one of the second aspect to the sixth aspect, the communication apparatus or the chip system according to any one of the eighth aspect to the twelfth aspect, and the communication apparatus or the chip system according to any one of the fourteenth aspect to the eighteenth aspect.

Alternatively, the communication system may include the communication apparatus or the chip system according to any one of the twentieth aspect to the twenty-fourth aspect, and the communication apparatus or the chip system according to any one of the twenty-sixth aspect to the thirtieth aspect.

BRIEF DESCRIPTION OF THE DRAWINGS

FIG. 6A and FIG. 6B are a flowchart of a data transmission method according to an embodiment of this application;

DETAILED DESCRIPTION OF ILLUSTRATIVE EMBODIMENTS

In a communication system, in a scenario in which a network side device sends multicast service data of a multicast service to a plurality of terminals (for example, a plurality of terminals in a same multicast group), to improve resource utilization, the multicast service data is transmitted in a "pseudo broadcast" manner. The "pseudo broadcast" manner may mean that the multicast service data sent to the plurality of terminals is combined in a UPF and/or an access network device.

Figure 1A:
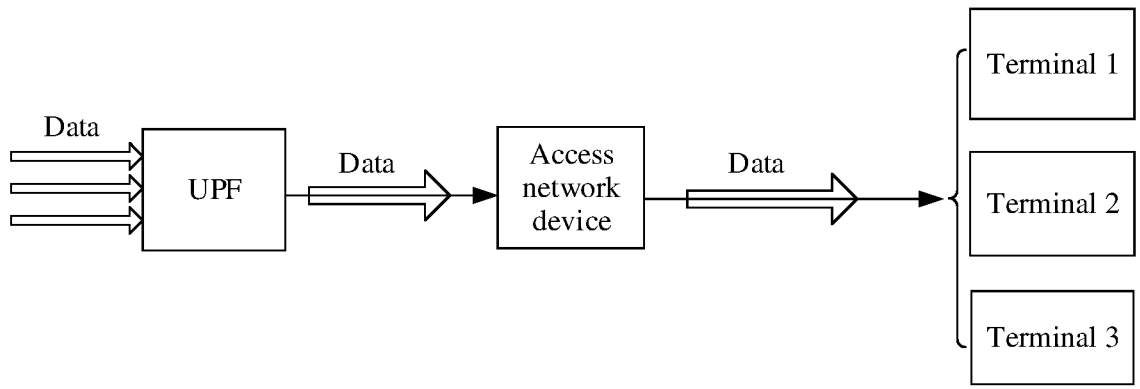
FIG. 1a is a schematic diagram of a "pseudo broadcast" manner.

For example, FIG. 1a is a schematic diagram showing that multicast service data sent to a plurality of terminals is combined in a UPF and an access network device. As shown in FIG. 1a, after combining received multicast service data sent to a plurality of terminals into one piece of multicast service data, the UPF sends the multicast service data to the access network device through a communication connection. After receiving the multicast service data, the access network device encodes the multicast service data by using a group radio network temporary identifier (RNTI), and then broadcasts the multicast service data to a plurality of terminals. The UPF does not need to send a plurality of pieces of multicast service data to the access network device through a plurality of communication connections, and the access network device does not need to send the plurality of pieces of multicast service data to the plurality of terminals through a plurality of communication connections. This improves resource utilization.

Figure 1B:
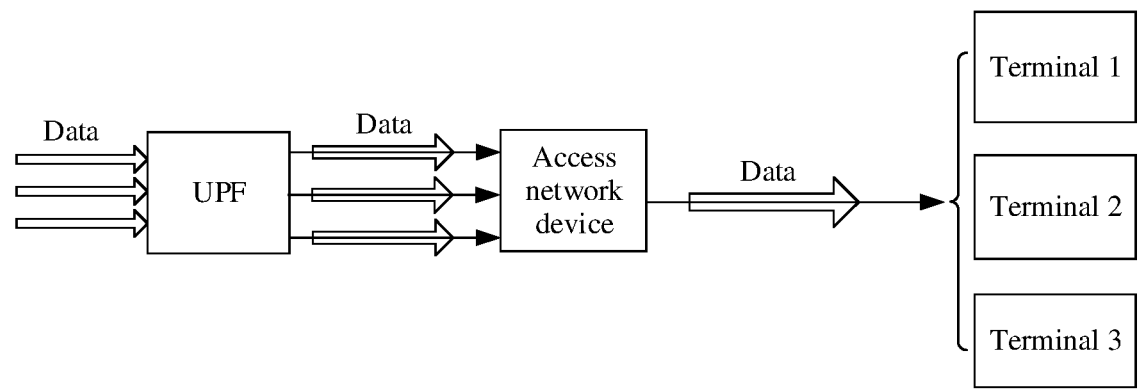
FIG. 1b is a schematic diagram of another "pseudo broadcast" manner.

For another example, FIG. 1b is a schematic diagram showing that multicast service data sent to a plurality of terminals is combined in an access network device. As shown in FIG. 1b, a UPF sends a plurality of pieces of multicast service data to be sent to the plurality of terminals to the access network device. After receiving the plurality of pieces of multicast service data, the access network device combines the plurality of pieces of multicast service data into one piece of multicast service data, encodes combined multicast service data by using a group RNTI, and then broadcasts the combined multicast service data to the plurality of terminals. The access network device does not need to send the plurality of pieces of multicast service data to the plurality of terminals through a plurality of communication connections. This improves resource utilization.

Figure 1C:
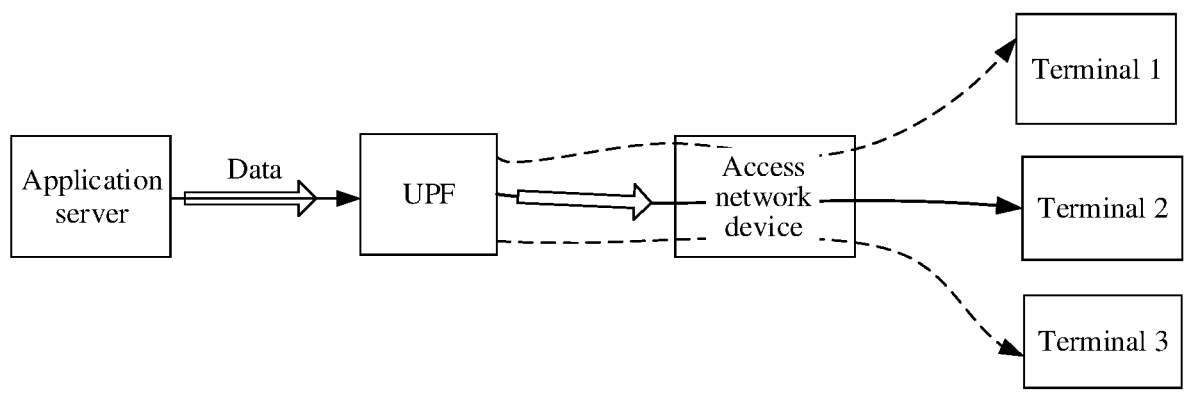
FIG. 1c is a schematic diagram of another "pseudo broadcast" manner.

In the pseudo broadcast manner shown in FIG. 1a, the communication connection for transmitting the multicast service data between the UPF and the access network device may be a communication connection corresponding to a unicast protocol data unit (PDU) session of any terminal in a multicast group. For example, as shown in FIG. 1c, there are three terminals in the multicast group: a terminal 1, a terminal 2, and a terminal 3. Each terminal establishes a PDU session, PDU sessions of all the terminals correspond to a same UPF, and one PDU session includes a communication connection between the UPF and the access network device and a communication connection between the access network device and a terminal. Before multicast service data is sent to the three terminals, one PDU session may be selected in advance from the PDU sessions of the three terminals, for example, a PDU session of the terminal 2 shown in FIG. 1c. After receiving multicast service data sent by an application server, the UPF maps the multicast service data to a quality of service flow (QoS flow, QF) corresponding to the PDU session of the terminal 2, determines downlink tunnel information of the access network device corresponding to the PDU session, and sends, to the access network device based on the downlink tunnel information of the access network device, the multicast service data mapped to the QF. The access network device sends the received multicast service data to the three terminals. This improves resource utilization.

It should be noted that the communication connection in embodiments of this application may be alternatively described as a downlink transmission tunnel. The PDU session of the terminal may be replaced with a unicast PDU session of the terminal. The downlink tunnel information of the access network device may be for establishing a communication connection between the UPF and the access network device. The downlink tunnel information of the access network device may include an internet protocol (IP) address of the access network device and/or a tunnel endpoint identifier (TEID) of the access network device. After establishment of the PDU session of the terminal is completed, a session management network element may store, in the UPF, the downlink tunnel information of the access network device corresponding to the PDU session of the terminal and a quality of service flow identifier (QoS flow identifier, QFI) of the PDU session, so that the UPF sends, based on a correspondence between the downlink tunnel information of the access network device and the QFI, the multicast service data mapped to the QF to the access network device indicated by the downlink tunnel information.

In the manner shown in FIG. 1a, if a terminal corresponding to a selected PDU session, for example, the terminal 2, is in a preset state (for example, an idle state or an inactive state), the selected PDU session is released, and the UPF may disconnect from the access network device, and delete the downlink tunnel information of the access network device from a local storage of the UPF. In this case, if the UPF still needs to transmit the multicast service data by using the PDU session, when finding that the downlink tunnel information of the access network device corresponding to the QF corresponding to the multicast service data does not exist locally, the UPF may trigger the access network device or a core network device to initiate paging for the terminal. After the paging succeeds, the downlink tunnel information of the access network device is configured on the UPF, so that the UPF sends the multicast service data to the access network device again based on the downlink tunnel information of the access network device, and the access network device sends the multicast service data to a plurality of terminals. However, in this manner, only a successfully paged terminal and another terminal in a radio resource control (RRC) connected state in the plurality of terminals can receive the multicast service data. A terminal that has a multicast service data requirement but is in a preset state cannot receive the multicast service data because the communication connection to the access network device is disconnected. This cannot meet a requirement of receiving the multicast service data by all terminals in the "pseudo broadcast" manner. Similarly, in the manner shown in FIG. 1b, if a terminal in the multicast group has a multicast service data requirement but is in a preset state, such a terminal cannot receive the multicast service data because the communication connection to the access network device is disconnected. This cannot meet a requirement of receiving the multicast service data by all terminals in the multicast group in the "pseudo broadcast" manner.

For example, as shown in FIG. 1c, it is assumed that a terminal 2 and a terminal 3 are in an idle state, a terminal 1 is in an RRC connected state, a selected PDU session of the terminal 2 is for transmitting multicast service data, and downlink tunnel information of an access network device corresponding to the PDU session of the terminal 2 is deleted from a UPF. In this case, if the UPF still needs to transmit the multicast service data by using the PDU session of the terminal 2, the UPF pages the terminal 2. After the terminal 2 is successfully paged, the downlink tunnel information of the access network device corresponding to the PDU session of the terminal 2 is reconfigured on the UPF. The UPF sends the multicast service data to the access network device based on the downlink tunnel information of the access network device, and the access network device sends the data to the terminal 1 and the terminal 2. Because the terminal 3 is in the idle state, a communication connection between the terminal 3 and the access network device is disconnected. As a result, the terminal 3 cannot receive the multicast service data.

To resolve the technical problem, in this application, when there is at least one terminal in a preset state (for example, an idle state or an inactive state) in a multicast group, a session management network element indicates a user plane network element to send notification information to the session management network element when data of a first multicast service arrives at the user plane network element, and triggers, when the session management network element receives the notification information, paging for the terminal in the preset state. In this way, when no terminal exists in the terminal in the preset state or no terminal in the preset state exists in all terminals in the multicast group, the user plane network element is indicated to send the data of the first multicast service. Alternatively, when a terminal that is included in a multicast group and that corresponds to a first access network device is in a preset state, after receiving data of a first multicast service, the first access network device first buffers the data of the first multicast service. In addition, the first access network device pages the terminal in the preset state, triggers the terminal to establish a communication connection to the first access network device, and delivers the buffered data of the first multicast service when there is no terminal that is in the preset state in the multicast group. This ensures that all terminals in the multicast group receive the data of the first multicast service.

The preset state described in this application may include any one of an idle state, an inactive state, or a state in which no communication connection to an access network device exists for transmitting the data of the first multicast service, and may further include a state in which no communication connection between an access network device and the user plane network element exists for transmitting the data of the first multicast service, or the like. That no communication connection to an access network device exists for transmitting the data of the multicast service may be understood as that context information of a multicast session corresponding to the first multicast service is released/deleted/removed on the access network device side. That no communication connection between an access network device and the user plane network element exists for transmitting the data of the first multicast service may be understood as that the user plane network element releases a transmission tunnel corresponding to the multicast session, for example, deleting locally stored tunnel information of the access network device, or deleting/removing/releasing a locally stored N4 context corresponding to the first multicast service.

The connected state described in this application may be replaced with a non-idle state. For a core network device (for example, a mobility management network element or the session management network element), the connected state may include a radio access control (RRC) connected (RRC_connected) state and a connection management (CM) connected (CM_connected) state, or the connected state may include an inactive state and a CM connected state. For the access network device, the connected state may include an RRC connected state.

The RRC connected state may mean that there is an RRC connection between the terminal and the access network device, and the CM connected state may mean that there is a non-access stratum (NAS) signaling connection between the terminal and the core network device (for example, the mobility management network element), and there is an N2 connection between the access network device and the core network device. In the RRC connected state and the CM connected state, both the access network device and the core network device store a context of the terminal. The access network device knows that the terminal is within a coverage area of the access network device or within a management range of the access network device. The core network device knows which access network device can be used to locate or find the terminal. In the connected state, the terminal may perform downlink data and/or uplink data transmission with the access network device.

The idle state may mean that there is no RRC connection between the terminal and the access network device. The idle state may be referred to as an RRC_idle state. In the idle state, the access network device does not store a context of the terminal, there is no NAS signaling connection between the terminal and the core network device (for example, the mobility management network element), there is no N2 connection between the access network device and the core network device (for example, the mobility management network element), and the core network device stores the context of the terminal. The access network device does not know whether the terminal is within a coverage area of the access network device. The core network device does not know the terminal is within a coverage area or a management range of which access network device, and the access network device does not know which access network device can be used to locate or find the terminal.

The inactive state may be referred to as an RRC_inactive state. The inactive state may mean that there is no RRC connection between the terminal and the access network device. In the inactive state, there is no NAS signaling connection between the terminal and the core network device (for example, the mobility management network element), and there is an N2 connection between the access network device and the core network device (for example, the mobility management network element). The access network device stores a context of the terminal, and the core network device may store the context of the terminal. The access network device does not know a specific cell on which the terminal camps within a coverage area of the access network device or whether the terminal is within a management range of the access network device. The core network device knows the terminal is within a coverage area or a management range of which access network device, and the core network device knows which access network device can be used to locate or find the terminal.

Figure 2:
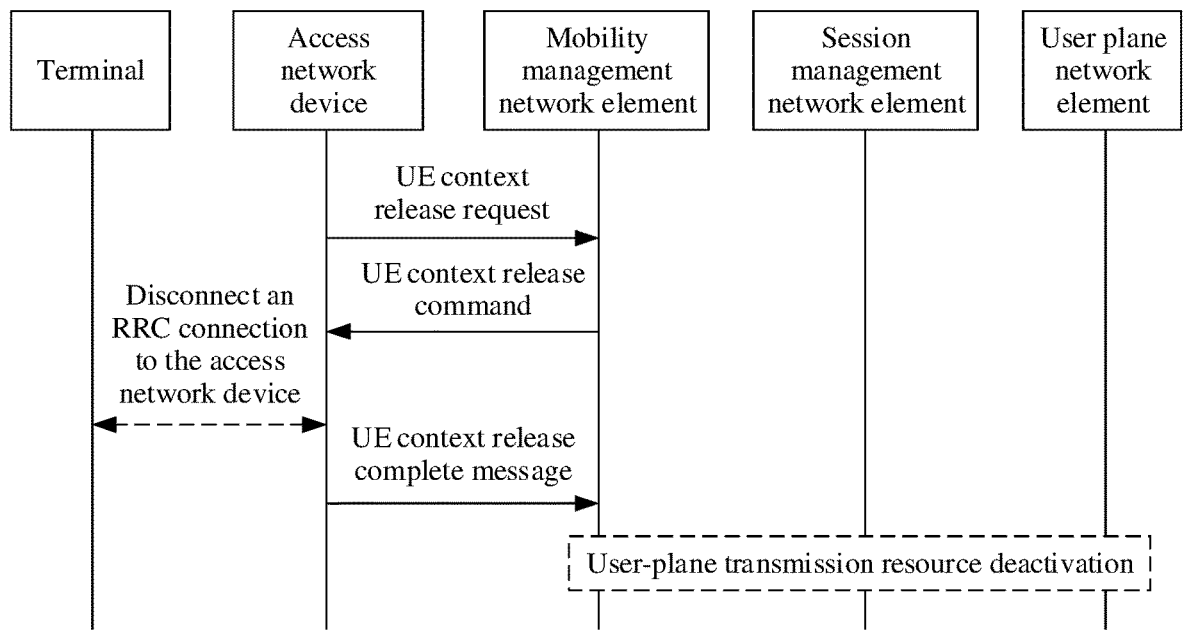
FIG. 2 is a schematic flowchart of access network release.

The three states, RRC_connected, RRC_idle, and RRC_inactive, may be transited to each other. After a terminal selects a to-be-accessed cell and before the terminal accesses an access network device corresponding to the cell, the terminal may successfully establish an RRC connection to the access network device through an RRC establishment process, access the cell, enter an RRC_connected state, and trigger establishment of a CM connection between the access network device and a mobility management network element. In the RRC_connected state, if the terminal has no data transmission requirement in a long time, the access network device may transit a state of the terminal from the RRC_connected state to the RRC_idle state or the RRC_inactive state through an RRC release process. For example, as shown in FIG. 2, an access network device does not receive uplink or downlink data of a terminal within a specified period of time. In this case, the access network device determines to release a context of the terminal. The access network device sends, to a mobility management network element, a user equipment (UE) context release request that requests to release the context of the terminal. The mobility management network element receives the UE context release request, and sends a UE context release command to the access network device. The access network device receives the UE context release command, sends, to the terminal, an RRC release message for requesting the terminal to release an RRC connection. After receiving the RRC release message, the terminal disconnects the RRC connection from the access network device, and enters the RRC_idle state from the RRC_connected state or the RRC_inactive state. The access network device sends a UE context release complete message to the mobility management network element, and the mobility management network element receives the UE context release complete message. Further optionally, if the terminal currently has an active user plane context, the mobility management network element notifies a corresponding session management network element to deactivate a user-plane transmission resource. After the foregoing procedure is performed, the mobility management network element considers that the terminal is in a CM idle state.

Further, in the method shown in FIG. 2, to improve resource utilization, when the terminal establishes the PDU session, a process of deactivating/releasing the user-plane transmission resource of the terminal is further included. For example, the UE context release complete message sent by the access network device to the mobility management network element carries an identifier (ID) of the PDU session of the terminal. After receiving the UE context release complete message sent by the access network device, the mobility management network element sends a PDU session deactivation indication to the session management network element that manages the PDU session. After receiving the PDU session deactivation indication, the session management network element notifies the user plane network element to delete a correspondence between data of the terminal and a QF and a correspondence between the QF and downlink tunnel information, and release the user-plane transmission resource. For the process shown in FIG. 2, refer to a conventional technology. Details are not further described.

In the RRC_idle state, the terminal may transit the state of the terminal from the RRC_idle state to the RRC_connected state by using an RRC establishment process. For example, the access network device may send a paging message to the terminal. After receiving the paging message and determining that the terminal is paged, the terminal is triggered to initiate an RRC establishment process, to attempt to establish an RRC connection to the access network device to enter the RRC_connected state. If the RRC connection is successfully established, the terminal enters the RRC_connected state. If the RRC connection fails to be established, the terminal continues to stay in the RRC_idle state. When the terminal is in the RRC_inactive state, the terminal may receive the paging message from the access network device, and attempt to resume the RRC connection to the access network device through an RRC resume process after determining that the terminal is paged, to enter the RRC_connected state. For example, the terminal sends an RRC resume request message to the access network device, and the access network device sends an RRC establishment message or an RRC resume message to the terminal after receiving the RRC resume request message, so that the state of the terminal can be transited to the RRC_connected state. When the terminal is in the RRC_inactive state, the access network device may transit the state of the terminal from the RRC_inactive state to the RRC_idle state through an RRC release process. For example, the access network device sends an RRC release message to the terminal, so that the state of the terminal is transited from the RRC_inactive state to the RRC_idle state, or the access network device sends an RRC reject message to the terminal, so that the terminal continues to stay in the RRC_inactive state.

It should be noted that the context of the terminal stored in the access network device is different from the context of the terminal stored in the core network device. The context of the terminal stored in the access network device is related to data transmission of the terminal. The context of the terminal stored in the access network device may include identification information of the terminal and a quality of service profile (QoS profile). The context of the terminal stored in the core network device is a context related to mobility and registration of the terminal, for example, the context of the terminal stored in the core network device may include the identification information of the terminal, location information of the terminal, a registration area of the terminal, a current CM connected state of the terminal, and the like. The identification information of the terminal may identify the terminal. The identification information of the terminal may be any one of an Internet Protocol (IP) address of the terminal, a media access control (MAC) address of the terminal, an international mobile subscriber identity (IMSI) of the terminal, or an identifier of a PDU session of the terminal. The identification information of the terminal may alternatively be other information that can identify the terminal in a future communication standard, for example, a session management context identifier (SM context ID). This is not limited.

The following describes the technical solutions in embodiments of this application with reference to the accompanying drawings in embodiments of this application.

Figure 3A:
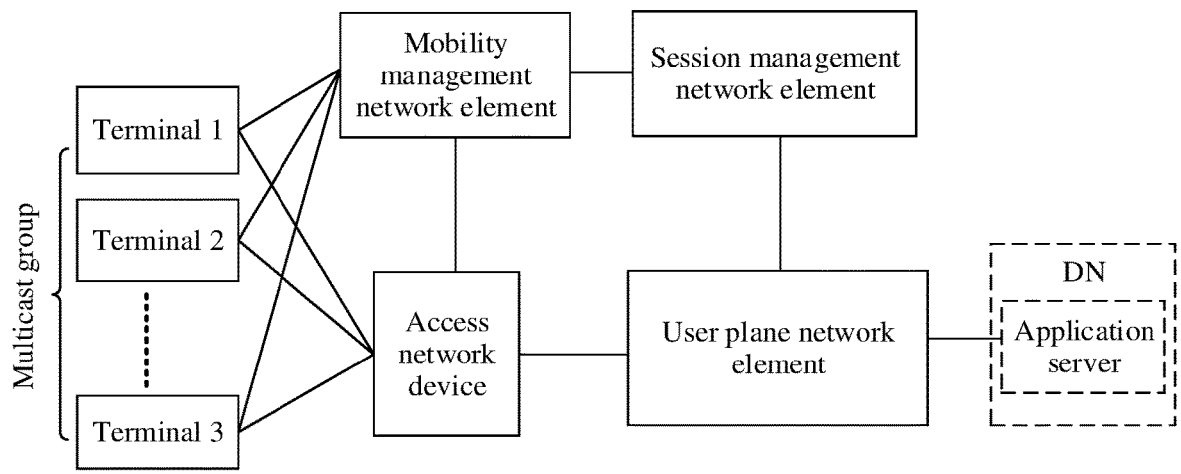
FIG. 3a is a schematic diagram of an architecture of a communication system.

The data transmission method provided in embodiments of this application may be applied to a communication system shown in FIG. 3a. As shown in FIG. 3a, the communication system may include a plurality of terminals, a mobility management network element, a session management network element, an access network device, and a user plane network element. Further, the communication system shown in FIG. 3a may further include a data network (data network, DN), and the DN may include an application server (AS). The following describes network elements or devices in the architecture shown in FIG. 3a.

The terminal may be a device configured to implement a wireless communication function, for example, a terminal or a chip that can be used in the terminal. The terminal may be UE, an access terminal, a terminal unit, a terminal station, a mobile station, a mobile console, a remote station, a remote terminal, a mobile device, a wireless communication device, a terminal agent, a terminal apparatus, or the like in a 5G network or a future evolved communication system. The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

The access network device is mainly configured to implement functions such as a physical layer function, resource scheduling and management, and access control and mobility management of the terminal. The access network device may be a device supporting wired access, or may be a device supporting wireless access. For example, the access network device may be an access network (AN)/a radio access network (RAN), where the AN/RAN includes a plurality of 5G-AN/5G-RAN nodes. A 5G-AN/5G-RAN node may be an access point (AP), a NodeB (nodeB, NB), an enhanced NodeB (eNB), a next-generation NodeB (NR nodeB, gNB), a transmission reception point (TRP), a transmission point (TP), another access node, or the like.

The mobility management network element is mainly responsible for access authentication of the terminal, mobility management, signaling exchange between functional network elements, and the like, such as managing a registration status of a user, a connection status of a user, user registration and network access, tracking area update, user authentication during cell handover, and key security.

The session management network element is mainly configured to implement a user-plane transmission logical channel, for example, session management functions such as establishment, release, and change of a PDU session.

The user plane network element may be used as an anchor on the user-plane transmission logical channel, and is configured to complete functions such as routing and forwarding of user plane data. For example, the user plane network element establishes a channel (namely, the user-plane transmission logical channel) between the user plane network element and the terminal, forwards a data packet between the terminal and the DN on the channel, and is responsible for data packet filtering, data forwarding, rate control, and generation of charging information for the terminal.

The DN is an operator network that may provide a data transmission service for a user, for example, an operator network that may provide an internet protocol (IP) multimedia service (IMS) for the user. An AS may be deployed in the DN, and the application server may provide a data transmission service for the user.

It should be noted that FIG. 3a is merely an example diagram of the architecture. In addition to the function units shown in FIG. 3a, the system may further include another functional network element, for example, an operation and management (O&M) network element. This is not limited in embodiments of this application. In addition, names of the devices in FIG. 3a are not limited. In addition to the names shown in FIG. 3a, the devices may also have other names. For example, the names are replaced with names of network elements having same or similar functions. This is not limited.

The system shown in FIG. 3a may be a 3rd generation partnership project (3GPP) communication system, for example, a 4th generation (4G) communication system, a long term evolution (LTE) system, a 5th generation (5th generation, 5G) communication system, a new radio (NR) system, a next generation communication system, or a non-3GPP communication system. This is not limited.

Figure 3B:
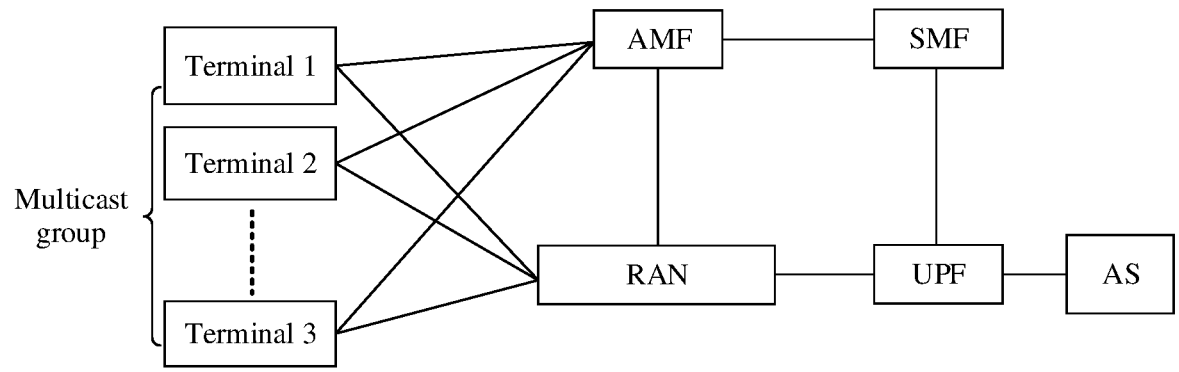
FIG. 3b is a schematic diagram of an architecture of a 5G communication system.

For example, the communication system shown in FIG. 3a is a 5G communication system shown in FIG. 3b. As shown in FIG. 3b, a network element or an entity corresponding to the session management network element may be a session management function (SMF) in the 5G communication system, a network element or an entity corresponding to the user plane network element may be a user plane function (UPF) in the 5G communication system, a network element or an entity corresponding to the access network device may be a radio access network (RAN) in the 5G communication system, and a network element or an entity corresponding to the mobility management network element may be an access and mobility management function (AMF) in the 5G communication system.

Optionally, the session management network element and the mobility management network element in embodiments of this application each may also be referred to a communication apparatus, and may be a general-purpose device or a dedicated device. This is not specifically limited in embodiments of this application.

Optionally, a related function of the mobility management network element, the user plane network element, or the access network device in embodiments of this application may be implemented by one device, may be jointly implemented by a plurality of devices, or may be implemented by one or more function modules in one device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 4:
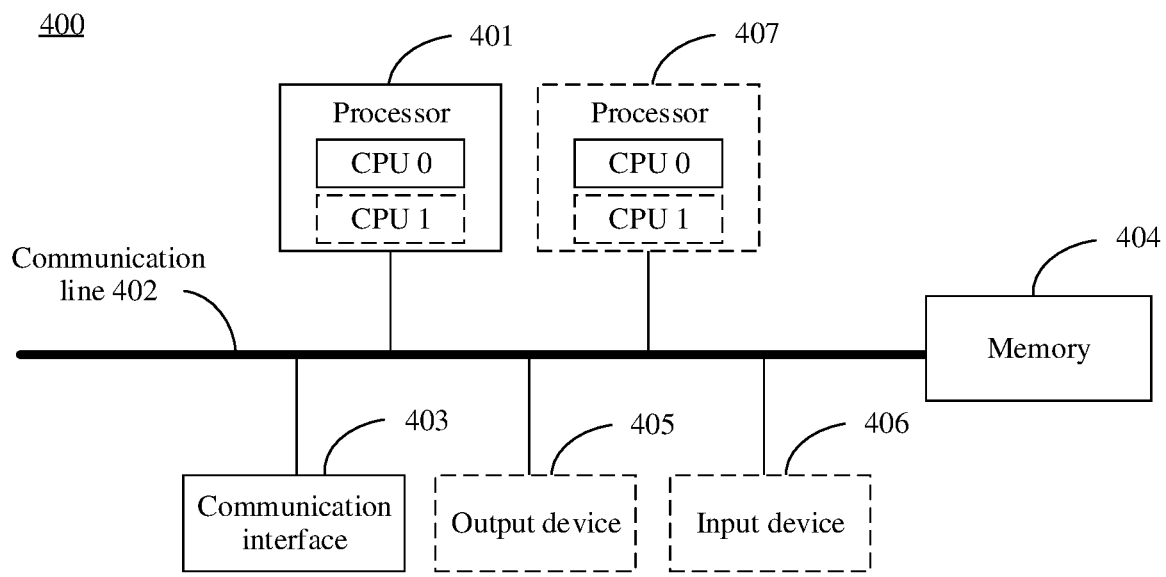
FIG. 4 is a schematic composition diagram of a communication apparatus 400 according to an embodiment of this application.

During specific implementation, each device (such as the session management network element, the user plane network element, the mobility management network element, or the access network device) shown in FIG. 3a may use a composition structure shown in FIG. 4, or include components shown in FIG. 4. FIG. 4 is a schematic composition diagram of a communication apparatus 400 according to an embodiment of this application. The communication apparatus 400 may include a processor 401 and a memory 404. Further, the communication apparatus 400 may further include a communication line 402 and a communication interface 403. The processor 401, the memory 404, and the communication interface 403 may be connected to each other through the communication line 402.

The processor 401 may be a central processing unit (CPU), a general-purpose processor, a network processor (NP), a digital signal processor (DSP), a microprocessor, a microcontroller, a programmable logic device (PLD), or any combination thereof. The processor 401 may alternatively be another apparatus having a processing function, for example, a circuit, a component, or a software module. This is not limited.

The communication line 402 is configured to transmit information between the components included in the communication apparatus 400.

The communication interface 403 is configured to communicate with another device or another communication network. The another communication network may be an Ethernet, a radio access network (RAN), a wireless local area network (WLAN), or the like. The communication interface 403 may be a module, a circuit, a transceiver, or any apparatus that can implement communication.

The memory 404 is configured to store instructions. The instructions may be a computer program.

The memory 404 may be a read-only memory (ROM) or another type of static storage device that can store static information and/or instructions, may be a random access memory (RAM) or another type of dynamic storage device that can store information and/or instructions, or may be an electrically erasable programmable read-only memory (EEPROM), a compact disc read-only memory (CD-ROM) or another compact disc storage, optical disc storage (including a compressed optical disc, a laser disc, an optical disc, a digital universal optical disc, and a Blu-ray optical disc), magnetic disk storage medium, or another magnetic storage device. This is not limited.

It should be noted that the memory 404 may exist independently of the processor 401, or may be integrated into the processor 401. The memory 404 may be configured to store instructions, program code, some data, or the like. The memory 404 may be located inside the communication apparatus 400, or may be located outside the communication apparatus 400. This is not limited.

The processor 401 is configured to execute the instructions stored in the memory 404, to implement the data transmission method provided in the following embodiments of this application. For example, when the communication apparatus 400 is a session management network element, or a chip or a system-on-a-chip in the session management network element, the processor 401 executes instructions stored in the memory 404, to implement steps performed by the session management network element in the following embodiments of this application. For another example, when the communication apparatus 400 is a mobility management network element, or a chip or a system-on-a-chip in the mobility management network element, the processor 401 may execute the instructions stored in the memory 404, to implement steps performed by the mobility management network element in the following embodiments of this application.

In an example, the processor 401 may include one or more CPUs, for example, a CPU 0 and a CPU 1 in FIG. 4.

In an optional implementation, the communication apparatus 400 includes a plurality of processors. For example, the communication apparatus may further include a processor 407 in addition to the processor 401 in FIG. 4.

In an optional implementation, the communication apparatus 400 further includes an output device 405 and an input device 406. For example, the input device 406 is a keyboard, a mouse, a microphone, a joystick, or another device, and the output device 405 is a display, a speaker, or another device.

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communication apparatus. In addition to the components shown in FIG. 4, the communication apparatus may include more or fewer components than those shown in the figure, or some components may be combined, or different component arrangements may be used.

In this embodiment of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Another name may alternatively be used during specific implementation. This is not limited.

The following uses the communication system shown in FIG. 3a as an example to describe the data transmission method provided in embodiments of this application. Network elements in the following embodiments may have components shown in FIG. 4. Details are not described again. It should be noted that, in embodiments of this application, names of messages exchanged between devices, names of parameters in the messages, or the like are merely examples. Another name may alternatively be used during specific implementation. For example, multicast in embodiments of this application may be replaced with terms such as broadcast (broadcast), groupcast, and multicast/broadcast. "Determining" in embodiments of this application may also be understood as creating (create) or generating (generate), and "including" in embodiments of this application may also be understood as "carrying" and the like. Details are not specifically limited in embodiments of this application.

Figure 5:
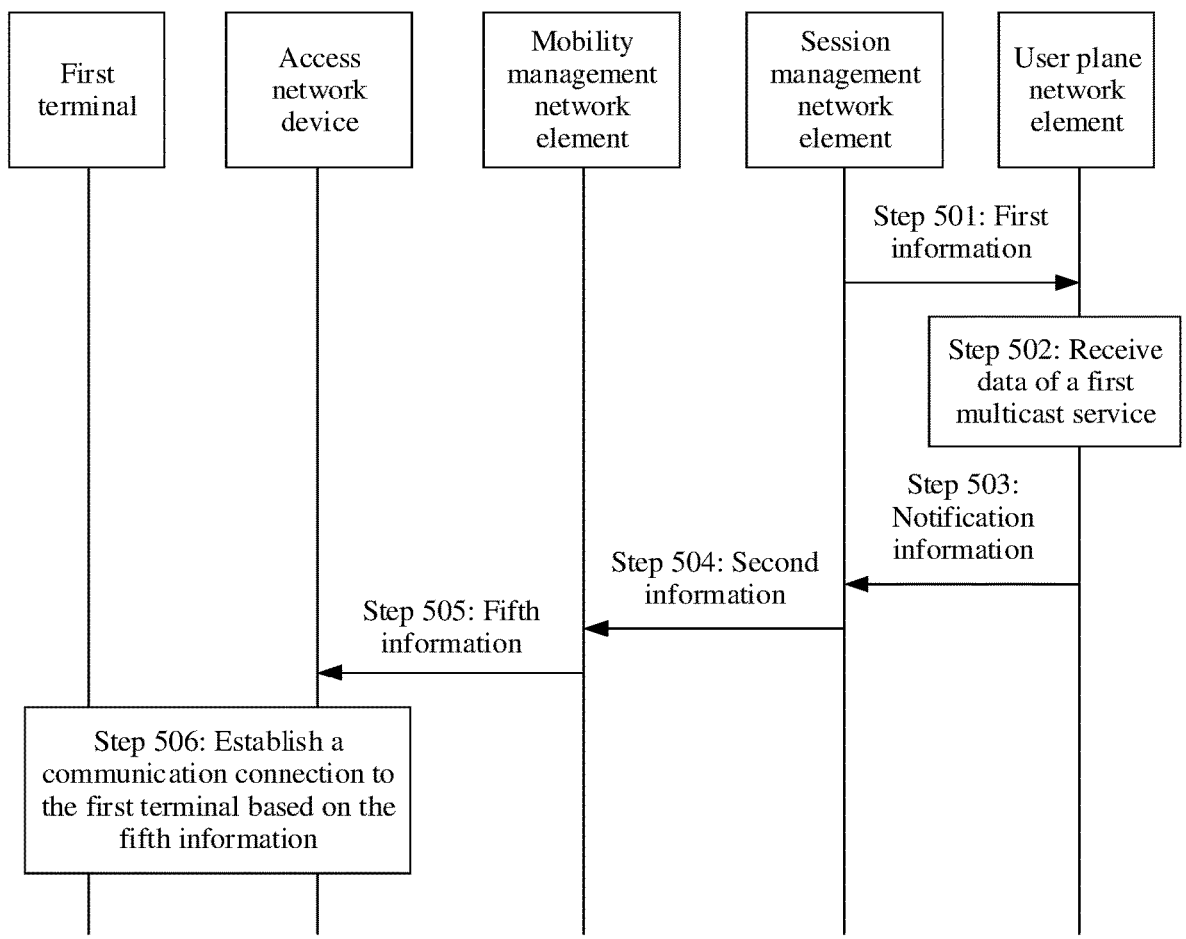
FIG. 5 is a flowchart of a data transmission method according to an embodiment of this application.

FIG. 5 shows a data transmission method according to an embodiment of this application. As shown in FIG. 5, the method may include the following steps.

Step 501: A session management network element sends first information to a user plane network element when there is at least one terminal in a preset state in a multicast group corresponding to a first multicast service.

The session management network element may be a session management network element that manages a multicast session corresponding to the first multicast service, for example, a multicast session management network element. Alternatively, the session management network element may be a session management network element that manages a PDU session (for example, a unicast session) of a terminal, for example, a unicast session management network element. The user plane network element may be an anchor of the first multicast service, or the user plane network element may not be an anchor of the first multicast service. The user plane network element may be a user plane network element configured to connect an access network device to the anchor of the first multicast service, for example, may be a user plane network element corresponding to a PDU session, that is, an anchor of a unicast service. A communication connection is established between the user plane network element and the access network device, and a communication connection is established between the user plane network element and the anchor of the first multicast service.

That there is at least one terminal in a preset state in a multicast group corresponding to a first multicast service may be alternatively described as that a terminal corresponding to at least one member in the multicast group corresponding to the first multicast service is in the preset state, where the member may be a user who uses the terminal, that is, a user of the terminal. The first multicast service may be a service oriented to a plurality of terminals. For example, the first multicast service may be a television program, a file transfer service, intra-group voice or video communication, or a broadcast service in a vehicle platoon. The plurality of terminals to which the first multicast service is oriented may join a group. The group may be referred to as the multicast group corresponding to the first multicast service. All terminals in the multicast group may be authorized to receive data of the multicast service or may receive data of the multicast service without being authorized. That is, the multicast group corresponding to the first multicast service may be a combination of a plurality of terminals that receive the data of the first multicast service. For example, the multicast group may be a vehicle platoon that receives a command sent by a same command center, a user group that receives a same television program, or the like.

For example, before step 501, the plurality of terminals may join the multicast group in the manner shown in FIG. 1a or FIG. 1b, and the plurality of terminals share a same user plane network element. For example, each of the plurality of terminals may establish a PDU session of the terminal. The session management network element may select a PDU session from the PDU sessions established by the plurality of terminals or establish a dedicated channel of the multicast group, map the data of the first multicast service to a QF corresponding to the selected PDU session or the dedicated channel of the multicast group, locally store context information of the multicast group, where the context information of the multicast group may include identification information of the plurality of terminals joining the multicast group and a correspondence between identification information of the user plane network element and identification information of the first multicast service, and correspondingly configure a mapping relationship between the QF and the first multicast service for the user plane network element. In this way, after receiving the data of the first multicast service, the user plane network element sends the data of the first multicast service to the plurality of terminals by using the QF. For a detailed process in which the terminal establishes the PDU session and joins the multicast group, refer to a conventional technology. Details are not further described.

Related descriptions of the preset state, an idle state, and an inactive state are described above, and details are not described again. The session management network element may determine, by using the following example 1 or example 2, that there is at least one terminal in the preset state in the multicast group corresponding to the first multicast service. The following describes two manners in the example 1 and the example 2 by using an example in which a first terminal is in the preset state.

Example 1: Because determining that an RRC connection between the first terminal and the access network device is disconnected, a mobility management network element cannot transmit data to the first terminal. The mobility management network element sends, to the session management network element, fourth information for deactivating a user-plane transmission resource of the first terminal. The fourth information may carry identification information of a PDU session of the first terminal, for example, may carry an ID of the PDU session of the first terminal. The session management network element receives the fourth information, and determines, based on the fourth information, that the first terminal served by the mobility management network element is in the preset state.

The fourth information may be named a deactivation (deactivate) indication or another name. This is not limited. For example, the mobility management network element may include the fourth information in an Nsmf_PDU session update session management context request (Nsmf_PDU session_update SMContext request), and send the request to the session management network element.

When the session management network element is a multicast session management network element, that the mobility management network element sends the fourth information to the session management network element may include the mobility management network element sends, to a first network element, information (for example, identification information of the multicast group) indicating the multicast group corresponding to the first multicast service and the fourth information. The first network element receives the information indicating the multicast group corresponding to the first multicast service and the fourth information, and sends, to the session management network element that manages the multicast session corresponding to the multicast group, a subscription message that carries the fourth information. The first network element is a unicast session management network element corresponding to the first terminal or another intermediate network element configured to forward the fourth information. This is not limited.

Further, after determining that the first terminal is in the preset state, the session management network element may record, at a granularity of terminals, the terminal in the preset state in a context of the multicast group corresponding to the first multicast service. For example, the session management network element may correspondingly set flag information for identification information of a terminal in the context of the multicast group corresponding to the first multicast service, where the flag information indicates that the terminal identified by the identification information is in the preset state.

Example 2: Because determines that an RRC connection between a first terminal served by the mobility management network element and the access network device is disconnected, a mobility management network element cannot transmit data to the first terminal. The mobility management network element sends, to the session management network element, an event exposure notification message (Namf_EventExposure Notify) indicating that there is at least one terminal that is served by the mobility management network element and that is in the preset state in the multicast group corresponding to the first multicast service. The session management network element receives the event exposure notification message, and determines, based on the event exposure notification message, that there is the at least one terminal in the preset state in the multicast group corresponding to the first multicast service.

When the session management network element is a multicast session management network element, that the mobility management network element sends the event exposure notification message to the session management network element may include the mobility management network element sends, to a first network element, information (for example, identification information of the multicast group) indicating the multicast group corresponding to the first multicast service and the event exposure notification message. The first network element receives the information indicating the multicast group corresponding to the first multicast service and the event exposure notification message, and sends the event exposure notification message to the session management network element that manages the multicast session corresponding to the multicast group. The first network element is a unicast session management network element corresponding to the first terminal or another intermediate network element configured to forward the event exposure notification message. This is not limited.

It should be noted that, after the first network element receives the event exposure notification message or the fourth information sent by the mobility management network element, the first network element may send another type of message to the session management network element, for example, a request message or a subscription message. Content indicated by the another type of message is the same as content indicated by the event exposure notification message or the fourth information. This is not limited in this embodiment of this application.

Further, after the session management network element receives the event exposure notification message, and determines that there is the at least one terminal in the preset state in the multicast group corresponding to the first multicast service, the session management network element may record, at a granularity of multicast groups, that there is the at least one terminal in the preset state in the multicast group. For example, the session management network element correspondingly sets flag information for the context of the multicast group corresponding to the first multicast service, where the flag information indicates that there is the at least one terminal in the preset state in the multicast group. In this case, the session management network element does not need to know a specific terminal in the preset state.

Further, the session management network element may locally store a correspondence between identification information of the mobility management network element and the identification information of the first multicast service, to indicate that the terminal in the preset state in the multicast group corresponding to the first multicast service is served by the mobility management network element. If the session management network element receives the event exposure notification message through the first network element, the session management network element may further locally store identification information of the first network element and the identification information of the first multicast service, and the first network element may locally store the correspondence between the identification information of the mobility management network element and the identification information of the first multicast service.

The mobility management network element may determine, in the following manner, that the first terminal disconnects the RRC connection to the access network device the access network device or the mobility management network element triggers the AN release procedure shown in FIG. 2, so that the first terminal disconnects the RRC connection to the access network device. After the first terminal is in an RRC_idle state or an RRC_inactive state, the access network device sends, to the mobility management network element, a UE context release complete message that carries identification information of the first terminal. After receiving the UE context release complete message, the mobility management network element determines that the first terminal disconnects the RRC connection to the access network device. Alternatively, when the access network device determines that the first terminal has disconnected the RRC connection to the access network device and is in an RRC_idle state or an RRC_inactive state, or the access network device determines to release a context of the first terminal or release the RRC connection of the first terminal, the access network device sends a UE context release request message or a UE notification message (UE notification message) to the mobility management network element. After receiving the UE context release request message or the UE notification message, the mobility management network element determines that the first terminal disconnects the RRC connection to the access network device.

The first information may include first identification information. The first information may be for sending notification information to the session management network element when the data of the first multicast service arrives at the user plane network element, or may indicate the user plane network element to buffer or drop the data of the first multicast service. For example, after receiving, for the first time, information indicating to deactivate a user-plane transmission resource of a terminal in the multicast group corresponding to the first multicast service, or receiving, for the first time, the event exposure notification message sent by the mobility management network element, the session management network element may obtain the identification information of the user plane network element from the context of the multicast group, and send the first information to the user plane network element based on the identification information of the user plane network element.

In this embodiment of this application, that the session management network element sends the first information to the user plane network element may be understood as follows. That the data of the first multicast service arrives at the user plane network element is an event. The session management network element sends, to the user plane network element, a configuration, an instruction, or a processing rule corresponding to the event, so that the user plane network element triggers, based on the configuration, the instruction, or the processing rule delivered by the session management network element, reporting (report) or notification of the event. Alternatively, that the session management network element sends the first information to the user plane network element may be understood as the session management network element subscribes to a service provided by the user plane network element. For example, the session management network element sends, to the user plane network element, subscription information for subscribing (subscribe) to an event that the data of the first multicast service arrives at the user plane network element, where the subscription information includes a service type (or a trigger condition). When the service type (or the trigger condition) is met, the user plane network element sends notification information to the session management network element.

Specifically, that the session management network element sends the first information to the user plane network element may include the session management network element sends, to the user plane network element, a user plane connection establishment request message (for example, a packet forwarding control protocol (PFCP) session establishment request (PFCP Session Establishment Request)), a user plane connection establishment modification message (for example, a PFCP Session Modification Request), an N4 session establishment request, or an N4 session modification request message, including the processing rule, the indication, the configuration, or the subscription information t when the data of the first multicast service arrives at the user plane network element. The user plane network element sends a report or a notification to the session management network element based on the processing rule, the instruction, the configuration, or the subscription information when the data of the first multicast service arrives at the user plane network element, for example, sends a user plane connection report request (for example, PFCP Session Report Request), an N4 session report request, or a downlink data notification that carries the notification information.

The first identification information may be for identifying the data of the first multicast service, and the first identification information may be replaced with the identification information of the first multicast service. In this embodiment of this application, the first identification information or the identification information of the first multicast service may include one or more of a temporary mobile group identity (TMGI) of the multicast group corresponding to the first multicast service, an Internet Protocol (IP) address of an application server (for example, an AF that provides the data of the first multicast service), a service identifier (service ID) of the first multicast service, packet filter information of the data of the first multicast service, or a service data flow (SDF) identification rule of the data of the first multicast service.

Step 502: The user plane network element receives the first information, and receives the data of the first multicast service.

For example, the user plane network element is the anchor of the first multicast service. If the session management network element is a multicast session management network element that manages the multicast session corresponding to the first multicast service, the user plane network element may directly receive the first information from the session management network element through an N 4 link between the user plane network element and the session management network element. If the session management network element is a session management network element that manages a unicast session, the user plane network element may receive the first information from the session management network element through a multicast session management network element that manages a multicast session. The user plane network element may receive the data of the first multicast service from the application server.

For example, the user plane network element is not the anchor of the first multicast service. If the session management network element is a multicast session management network element that manages the multicast session corresponding to the first multicast service, the user plane network element may receive first information of a unicast session management network element corresponding to the user plane network element. The first information is forwarded by the foregoing session management network element (that is, the multicast session management network element) to the unicast session management network element. If the session management network element is a session management network element that manages a unicast session, the user plane network element may directly receive the first information of the session management network element. The user plane network element may receive the data of the first multicast service from the anchor of the first multicast service.

Step 503: The user plane network element sends the notification information to the session management network element based on the first information. Correspondingly, the session management network element receives the notification information.

The notification information may indicate that the data of the first multicast service arrives at the user plane network element. The notification information may include information for identifying the data of the first multicast service, for example, the TMGI of the multicast group corresponding to the first multicast service, the IP address of the application server, the service identifier of the first multicast service, the packet filter information of the data of the first multicast service, or the identification rule of the data of the first multicast service.

For example, the user plane network element may send an N 4 response message to the session management network element, where the N 4 response message may carry the notification information. Alternatively, the user plane network element may send notification information to the session management network element, where the notification information may carry the notification information.

Further, if the first information further indicates to buffer the data of the first multicast service, the user plane network element determines, based on the first identification information carried in the first information, to buffer the data of the first multicast service that arrives at the user plane network element. Therefore, when receiving the data of the first multicast service sent by the application server, the user plane network element does not map the data of the first multicast service to the corresponding QF for sending, but stores the data of the first multicast service in a buffer.

Further, if the first information does not indicate to buffer the data of the first multicast service, but indicates to drop the data of the first multicast service, after receiving the data of the first multicast service, the user plane network element stops sending the data of the first multicast service, and drops the received data of the first multicast service, or the user plane network element still continues to send the received data of the first multicast service to avoid affecting receiving of the data of the first multicast service by another terminal in a connected state.

Step 504: The session management network element sends second information to the mobility management network element based on the notification information.

In an example, in step 501, if the session management network element records, at a granularity of terminals, the terminal in the preset state in the context of the multicast group corresponding to the first multicast service, after receiving the notification information, the session management network element determines, based on the identification information of the first multicast service carried in the notification information, that the data of the first multicast service has arrived at the user plane network element. The session management network element finds, by using the identification information of the first multicast service as an index, the context of the multicast group corresponding to the first multicast service, finds terminals in the preset state from the context of the multicast group, and separately sends, to mobility management network elements corresponding to the terminals in the preset state based on a correspondence between a terminal and a mobility management network element, information for triggering establishment of a communication connection between the terminal and the access network device.

The correspondence between the terminal and the mobility management network element may include a correspondence between identification information of the terminal and an ID of the mobility management network element. The correspondence may be stored in the session management network element when the terminal establishes the PDU session. The ID of the mobility management network element is for identifying the mobility management network element. The identification information of the terminal is described above. Details are not described again.

For example, the at least one terminal in the preset state includes the first terminal. The session management network element may send the second information to the mobility management network element corresponding to the first terminal. For example, the session management network element may send an N1N2 message transfer (Namf_Communication_N1N2Message Transfer) message to the mobility management network element corresponding to the first terminal, where the N1N2 message transfer message carries the second information.

The second information may be for triggering establishment of a communication connection that is for transmitting the data of the first multicast service and that is between the first terminal and a first access network device. The second information may include the identification information of the first terminal (for example, identification information of the PDU session of the first terminal) and N2 session management (N2 session management, N2 SM) information. The N2 SM information may be air interface resource configuration information, and is for allocating an air interface resource corresponding to the first multicast service to the first terminal. The N2 SM information may include related information of the first multicast service. The related information of the first multicast service is for triggering the first access network device to allocate an air interface resource to a multicast session, and including again the first terminal to the multicast group corresponding to the first multicast service. For example, the related information of the first multicast service may include the identification information of the first multicast service, and may further include a quality of service flow identifier (QFI) of a multicast quality of service (QoS) flow, QoS parameter information corresponding to the QFI of the multicast QoS flow, information about a unicast QoS flow corresponding to the multicast QoS flow, a QoS profile(s) of the multicast service, information (for example, core network N3 tunnel information (CN N3 tunnel information)) about a data transmission channel for sending uplink data on a core network side and a multicast session tunnel establishment request or indication. The information about the unicast QoS flow may include a QFI of the unicast QoS flow and QoS parameter information corresponding to the unicast QoS flow. The QoS parameter information may include one or more of a QFI, allocation and retention priority (ARP) information, a maximum flow bit rate (MFBR), and guaranteed flow bit rate (GFBR) information. Optionally, the second information may include the TMGI of the multicast group corresponding to the first multicast service.

In another example, in step 501, if the session management network element records, at a granularity of multicast groups, that there is the at least one terminal in the preset state in the multicast group, after receiving the notification information, the session management network element determines, based on the identification information of the first multicast service carried in the notification information, that the data of the first multicast service has arrived at the user plane network element, and sends, based on the correspondence between the identification information of the mobility management network element and the identification information of the first multicast service in step 501, information for triggering establishment of a communication connection between the terminal and the access network device to the mobility management network element corresponding to the multicast group, where the information may carry the N2 SM information described above. It should be noted that, in this example, the information that is sent by the session management network element to the mobility management network element corresponding to the multicast group and that is for triggering establishment of the communication connection between the terminal and the access network device may not carry identification information of a specific terminal, and may carry the TMGI of the multicast group, the identification information of the first multicast service, or the like.

It should be noted that the session management network element may directly send the second information to the mobility management network element, or may send the second information to the mobility management network element through the first network element or another network element. This is not limited in this application.

Similarly, for a terminal that is managed by another mobility management network element and that is in the preset state, the session management network element may send the information for triggering establishment of the communication connection between the terminal and the access network device to the another mobility management network element, until the session management network element sends, to mobility management network elements corresponding to all terminals in the preset state, the information for triggering establishment of the communication connection between the terminal and the access network device, so that all the terminals in the preset state are paged by the mobility management network element and establish communication connections to the access network device when transiting from the preset state to the RRC connected state.

In this application, one mobility management network element may manage one or more terminals in a multicast group. When the mobility management network element manages a plurality of terminals, and all of the plurality of terminals are in the preset state, in a possible design, the session management network element may send a plurality of pieces of second information to the mobility management network element, where the plurality of pieces of second information are in a one-to-one correspondence with the plurality of terminals in the preset state. One piece of second information includes identification information of one terminal, and the second information is for triggering establishment of a communication connection between the terminal corresponding to the second information and the first access network device. In another possible design, to reduce signaling overheads, the session management network element sends a piece of second information to the mobility management network element. The second information may be for triggering establishment of communication connections between a plurality of terminals in the preset state and the first access network device, and the second information may include identification information of the plurality of terminals. It should be understood that, that the second information includes the identification information of the plurality of terminals may be replaced with the second information includes a UE list, and the UE list includes the identification information of the plurality of terminals.

For example, it is assumed that the mobility management network element manages the first terminal and a second terminal in the multicast group, and both the first terminal and the second terminal are in the preset state. In this case, the session management network element may send two pieces of independent second information to the mobility management network element. One piece of second information is for triggering establishment of the communication connection between the first terminal and the first access network device, and the other piece of second information is for triggering establishment of a communication connection between the second terminal and the first access network device. Alternatively, to reduce signaling overheads, the session management network element sends one piece of second information to the mobility management network element, where the second information is for triggering establishment of the communication connection between the first terminal and the first access network device and the communication connection between the second terminal and the first access network device.

It should be noted that the session management network element may simultaneously or not simultaneously send, to different mobility management network elements, information for triggering establishment of a communication connection between the terminal in the preset state and the access network device. When the mobility management network element manages a plurality of terminals, and the plurality of terminals are in the preset state, the session management network element simultaneously or not simultaneously sends, to the mobility management network element, a plurality of pieces of information for triggering establishment of communication connections between the plurality of terminals and the access network device. This is not limited.

For example, the multicast group includes {UE 1, UE 2, UE 3, UE 4}, where the UE 1, the UE 2, and the UE 3 are in a preset state, the UE 1 and the UE 2 are managed by a mobility management network element 1, and the UE 3 is managed by a mobility management network element 2. After receiving the notification information, the session management network element may send information 1 to the mobility management network element 1, and send information 2 to the mobility management network element 2. The information 1 includes identification information of the UE 1 and identification information of the UE 2, and the information 1 is for triggering establishment of a communication connection between the UE 1 and the access network device and a communication connection between the UE 2 and the access network device. The information 2 includes identification information of the UE 3, and the information 2 is for triggering establishment of a communication connection between the UE 3 and the access network device.

Step 505: The mobility management network element receives the second information from the session management network element, and sends fifth information to the first access network device based on the second information.

The first access network device may be an access network device corresponding to the first terminal, and the first access network device may provide a network service for the first terminal.

The fifth information may be used by the first access network device to establish a communication connection that is for transmitting the data of the first multicast service and that is between the first access network device and the first terminal. For example, the fifth information may be used by the access network device to allocate an air interface resource corresponding to the first multicast service to the first terminal. The fifth information may carry the N2 SM information carried in the second information. Optionally, the fifth information may further carry the identification information of the first terminal or the identification information of the first multicast service (for example, the TMGI of the multicast group corresponding to the first multicast service), and security configuration information. The security configuration information may include one or more of security configuration information used when the data of the first multicast service is transmitted in a unicast manner or security configuration information used when the data of the first multicast service is transmitted in a multicast manner. It should be noted that, when the first terminal is in an inactive state, the air interface resource of the first terminal is released, and the security configuration information of the first terminal is still reserved and is not released. Therefore, the fifth information may include the N2 SM information, and does not include the security configuration information. When the first terminal is in an idle state, both the air interface resource of the first terminal and the security configuration information of the first terminal are released, and the fifth information includes the N2 SM information and the security configuration information.

For example, if the second information carries identification information of one terminal, for example, the identification information of the first terminal, after receiving the second information from the session management network element, the mobility management network element searches a correspondence between terminal identification information and a terminal state for a preset state of the first terminal by using the identification information of the first terminal carried in the second information as an index. When the first terminal is in an idle state, the mobility management network element obtains a paging area based on a registration area of the first terminal, for example, uses the registration area of the first terminal as the paging area. Then, the mobility management network element sends, to a first access network device corresponding to the paging area, a paging message for paging the first terminal. The first access network device receives and broadcasts the paging message. The first terminal detects the paging message, transits the state of the first terminal from the idle state to a connected state after establishing an RRC connection, and sends a service request message to the mobility management network element through the first access network device. The mobility management network element receives the service request message sent by the first terminal, establishes an N2 connection between the mobility management network element and the first access network device in response to the service request message sent by the first terminal so that the state of the terminal changes to the CM connected state, and sends an N2 request to the first access network device, where the N2 request carries the fifth information. In this case, the fifth information may carry the N2 SM information and the security configuration information. When the first terminal is in an inactive state, the mobility management network element sends an N2 request to the first access network device, where the N2 request carries the fifth information. In this case, the fifth information carries the N2 SM information, and may not need to carry the security configuration information.

It should be noted that, if the second information carries identification information of a plurality of terminals including the identification information of the first terminal, or the second information carries the TMGI of the multicast group corresponding to the first multicast service, and the mobility management network element stores the TMGI of the multicast group and identification information of a corresponding terminal, the second information corresponds to the plurality of terminals. After receiving the second information from the session management network element, the mobility management network element may search, by using the identification information of the terminal carried in the second information as an index, the correspondence between the terminal identification information and the terminal state for preset states of the plurality of terminals corresponding to the second information, or the mobility management network element searches, by using the TMGI carried in the second information as an index, for identification information of a terminal corresponding to the TMGI, and searches the correspondence between the terminal identification information and the terminal state for preset states of the plurality of terminals corresponding to the second information. When the plurality of terminals corresponding to the second information is in an idle state, the mobility management network element performs calculation on a union of registration areas of the plurality of terminals corresponding to the second information, to obtain the paging area.

It should be noted that this application is not limited to a time sequence in which the first terminal transits the state of the first terminal from the idle state to the connected state. The first terminal may transit the state of the first terminal from the idle state to the connected state when receiving the paging message, or may transit the state of the first terminal from the idle state to the connected state after the first terminal establishes the communication connection to the access network device. In this case, the connected state may be the RRC connected state.

In this application, the mobility management network element may subscribe to a state of each terminal in the multicast group from the first access network device. For example, the mobility management network element may send, to the first access network device, a subscription request for subscribing to an RRC state of the terminal. The first access network device receives the subscription request, includes the RRC state of the terminal to a subscription response, and notifies the mobility management network element. The mobility management network element receives the subscription response, and stores the correspondence between the terminal identification information and the terminal state. The RRC state of the terminal may include an RRC state and a CM state, the CM state includes a CM connected state and a CM idle state. The RRC state may include an idle state, an inactive state, and the like.

Similarly, for another terminal in the preset state, the mobility management network element may send, to an access network device corresponding to the another terminal in the preset state, information indicating the access network device to establish a communication connection to the terminal based on the foregoing process. For example, the second terminal is a terminal in the preset state, and the second terminal corresponds to a second access network device. The mobility management network element sends sixth information to the second access network device based on the second information, where the sixth information is used by the second access network device to establish a communication connection to the second terminal, until the information indicating that access network devices corresponding to all the terminals in the preset state to establish communication connections to the terminal in the preset state is sent to the access network devices, to trigger all the terminals in the preset state to establish the communication connections to the access network devices.

In this application, a same access network device may correspond to or serve one or more terminals in a preset state. If the access network device corresponds to or serves a plurality of terminals in a preset state, the mobility management network element may send a plurality of pieces of information to the access network device. The plurality of pieces of information are in a one-to-one correspondence with the plurality of terminals in the preset state, and each piece of information is for establishing a communication connection between the terminal corresponding to the information and the access network device. Alternatively, to reduce signaling overheads, the mobility management network element may send one piece of information to the access network device, where the information is for establishing communication connections between the plurality of terminals and the access network device.

For example, it is assumed that the first access network device corresponds to the first terminal and the second terminal, and the first terminal and the second terminal are in a preset state. In this case, the mobility management network element may send two pieces of independent fifth information to the first access network device, where one piece of fifth information is for establishing a communication connection between the first terminal and the first access network device, and the other piece of fifth information is for establishing a communication connection between the second terminal and the first access network device. Alternatively, to reduce signaling overheads, the mobility management network element sends one piece of fifth information to the first access network device, where the fifth information is for establishing a communication connection between the first terminal and the first access network device and for establishing a communication connection between the second terminal and the first access network device.

Step 506: The first access network device receives the fifth information, and establishes the communication connection to the first terminal based on the fifth information.

For example, after receiving the fifth information, the first access network device allocates, to the first terminal based on the N2 SM information carried in the fifth information, an air interface resource corresponding to the first multicast service. For example, the first access network device configures, based on a unicast QFI and QoS parameter information corresponding to the unicast QFI that are carried in the N2 SM information, a corresponding data radio bearer (DRB) for transmitting the data of the first multicast service in a unicast manner, configures, based on QoS parameter information corresponding to a multicast QFI, a corresponding DRB for transmitting the data of the first multicast service in a multicast manner, and sends related information of the configured DRBs to the first terminal through an RRC connection reconfiguration process or an RRC resume process, so that the first terminal can receive the data of the first multicast service on the DRBs. In this way, the communication connection to the first terminal is established. Further, if the fifth information carries the security configuration information, the first access network device sends the security configuration information to the first terminal.

The RRC connection reconfiguration process may include when the first terminal is in the idle state, the first access network device performs RRC connection reconfiguration with the first terminal, and sends, to the first terminal, an RRC reconfiguration message that carries the related information of the DRBs configured by the first access network device. The RRC resume process may include when the first terminal is in the inactive state, the first access network device sends a paging message to the first terminal. When detecting the paging message, the first terminal transits the state of the first terminal from the inactive state to the connected state, and sends an RRC message, for example, an RRC resume request message, to the first access network device. The first access network device receives the RRC resume request message, and sends, to the first terminal, an RRC resume message that carries the related information of the DRBs.

In this application, the first access network device may send the paging message to the first terminal on a first channel. The first channel may be any one of the following channels, including a unicast channel between the first access network device and the first terminal, a common channel, and a dedicated channel of the multicast group corresponding to the first multicast service.

Similarly, the first access network device may establish a communication connection to another terminal according to the foregoing method. Details are not described again.

Further, after step 506, the first access network device sends first indication information to the mobility management network element, where the first indication information may indicate that establishment of the communication connection between the first terminal and the first access network device is completed, and the first indication information may include the identification information of the first terminal. If a communication connection between the first access network device and the user plane network element does not exist, and the N2 SM information further includes a multicast session tunnel establishment request, the first access network device further allocates multicast session tunnel information, for example, tunnel information of the first access network device. The tunnel information of the first access network device is for establishing a tunnel/channel for transmitting the data of the first multicast service. The first indication information received by the mobility management network element may include the tunnel information of the first access network device, a QFI of a QoS flow of a PDU session, and the like. The mobility management network element sends, to the session management network element, a PDU session context update request that carries the tunnel information of the first access network device and the QFI of the QoS flow of the PDU session. The session management network element receives the PDU session context update request, and performs N4 session update with the user plane network element. The user plane network element establishes the communication connection between the user plane network element and the first access network device based on the tunnel information of the first access network device, and then the user plane network element sends an N4 session update response to the session management network element.

Similarly, for another terminal that transits from a preset state to a connected state, the first access network device may also send, to the mobility management network element, indication information indicating that establishment of a communication connection between the terminal and the first access network device is completed. For example, the second terminal is used as an example. The first access network device sends second indication information to the mobility management network element. The second indication information may indicate that establishment of a communication connection between the second terminal and the first access network device is completed. The second indication information may include identification information of the second terminal.

It should be noted that, to reduce signaling overheads, when a same first access network device corresponds to/serves a plurality of terminals in a preset state, if the plurality of terminals in the preset state all perform the process shown in step 506 to establish communication connections to the first access network device, the first access network device may send indication information to the mobility management network element, where the indication information indicates that the plurality of terminals in the preset state have established the communication connection to the first access network device, and the indication information may include identification information of the plurality of terminals.

Further, after receiving the first indication information, the mobility management network element sends second indication information to the session management network element based on the first indication information. The second indication information may carry the identification information of the first terminal, and the second indication information may indicate that establishment of the communication connection between the first terminal and the first access network device is completed. Similarly, the mobility management network element receives third indication information from the second access network device, where the third indication information indicates that establishment of a communication connection between the second terminal and the second access network device is completed. The mobility management network element sends fourth indication information to the session management network element based on the third indication information, where the fourth indication information indicates that establishment of the communication connection between the second terminal and the second access network device is completed.

Alternatively, to reduce signaling overheads, the mobility management network element may send one piece of indication information to the session management network element after receiving indication information, sent by a plurality of access network devices, indicating that establishment of communication connections is completed. The indication information may indicate that establishment of all communication connections is completed, where the session management network element requests the mobility management network element to trigger establishment of the communication connections. For example, after receiving the first indication information and the second indication information, the mobility management network element sends one piece of indication information to the session management network element based on the first indication information and the second indication information, where the indication information includes the identification information of the first terminal and the identification information of the second terminal, and the indication information indicates that establishment of both the communication connection between the first terminal and the first access network device and the communication connection between the second terminal and the first access network device is completed, or the indication information indicates that establishment of all communication connections is completed, where the session management network element requests the mobility management network element to trigger establishment of the communication connections.

Alternatively, the mobility management network element sends fifth indication information to the session management network element based on second preset waiting duration, where the fifth indication information indicates that establishment of all communication connections that the session management network element triggers the mobility management network element to establish is completed. The mobility management network element sends the fifth indication information to the session management network element based on the second preset waiting duration, and the indication information is sent to the session management network element in either of the following two manners.

Manner 1: The second preset waiting duration may be set as required. Alternatively, if the mobility management network element requests establishment by a plurality of access network devices, preset duration is configured for each of the plurality of access network devices, and shortest preset duration is used as the second preset waiting duration.

In the manner 1, the mobility management network element maintains a timer, where duration of the timer is the second preset waiting duration. The timer is started when or at a moment after the mobility management network element requests asst access network device to establish a communication connection. When the timer expires after running for the second preset waiting duration, the fifth indication information is sent to the session management network element. Alternatively, the timer is started when or at a moment after the mobility management network element requests the last access network device to establish a communication connection. When the timer expires after running for the second preset waiting duration, the fifth indication information is sent to the session management network element.

Manner 2: If the mobility management network element requests establishment by a plurality of access network devices, one timer is set for each of the plurality of access network devices, and duration of the timer of each access network device is the second preset waiting duration. For each access network device, the timer is started when or at a moment after the mobility management network element starts to request the access network device to establish a communication connection. When timers of all access network devices expire after running, the fifth indication information is sent to the session management network element.

Further, optionally, the session management network element receives indication information sent by the mobility management network element, for example, the second indication information, the fourth indication information, or the fifth indication information, and determines, based on the indication information, that the communication connection that the session management network element request the mobility management network element to trigger is completed. When the session management network element receives the indication information sent by the mobility management network element, and determines, based on the indication information, that establishment of a communication connection between each terminal in the multicast group corresponding to the first multicast service and the access network device is completed, the session management network element sends third information to the user plane network element. Alternatively, when the session management network element receives the indication information sent by the mobility management network element, for example, the second indication information or the fourth indication information, and determines, based on the indication information, that establishment of the communication connection between each of the at least one terminal in the preset state and the access network device is completed, the session management network element sends third information to the user plane network element. Alternatively, in addition to relying on the indication information sent by the mobility management network element, the session management network element may send third information to the user plane network element based on first preset waiting duration.

The third information may be for notifying the user plane network element to send the data of the first multicast service. The third information may include second identification information, and the second identification information may include one or more of the TMGI of the multicast group corresponding to the first multicast service, the IP address of the application server, the service identifier of the first multicast service, the packet filter information of the data of the first multicast service, or the identification rule of the data of the first multicast service.

That the session management network element sends the third information to the user plane network element based on the first preset waiting duration may include either of the following two manners.

Manner 1: The first preset waiting duration may be set as required. Alternatively, if the session management network element triggers a plurality of mobility management network elements to establish communication connections, preset duration is configured for each of the plurality of mobility management network elements, and shortest preset duration is used as the first preset waiting duration.

In the manner 1, the session management network element maintains a timer, where duration of the timer is the first preset waiting duration. The timer is started when or at a moment after the session management network element triggers the $1^{st}$ mobility management network element to establish a communication connection. When the timer expires after running for the first preset waiting duration, the third information is sent to the user plane network element.

Manner 2: The session management network element sets a timer for the $1^{st}$ piece of second information sent to each mobility management network element, where duration of the timer is the first preset waiting duration. For each mobility management network element, the timer is started after or when the session management network element sends the $1^{st}$ piece of second information to the mobility management network element. When the timer expires after running, it is determined that establishment of a communication connection between each terminal corresponding to the mobility management network element and the first access network device is completed. After the timer corresponding to each mobility management network element expires, and it is determined that establishment of the communication connection between each terminal and the first access network device is completed, the third information is sent to the user plane network element.

Further, the user plane network element receives the third information, and sends the buffered data of the first multicast service based on the third information. For example, the user plane network element may map the data of the first multicast service to a QF, and send the data to the first access network device by using the QF, and the first access network device sends the data to the terminal through the communication connection between the first access network device and the terminal. Alternatively, if step 502 is replaced with that the user plane network element drops the received data of the first multicast service based on the first information after receiving the data of the first multicast service, the user plane network element receives the third information, may continue to receive, based on the third information, the data of the first multicast service that is re-sent by the application server, and sends the data of the first multicast service.

Based on the method shown in FIG. 5, when there is at least one terminal in the preset state in the multicast group corresponding to the multicast service, after receiving the data of the multicast service, the session management network element may be triggered to notify the user plane network element corresponding to the multicast service to first buffer the data of the multicast service, and then trigger paging of the terminal through the core network device, so that the terminal is in the connected state. When the communication connection is established between each terminal in the multicast group and the access network device, the user plane network element is triggered to send the received or buffered data of the multicast service to the terminal in the multicast group through the access network device, to ensure that the terminal in the multicast group receives the data of the multicast service.

It should be noted that, in embodiments of this application, words such as "first" and "second" are used to distinguish between same items or similar items having basically same functions and effects. A person skilled in the art may understand that the terms such as "first" and "second" do not limit a quantity or an execution sequence, and that the terms such as "first" and "second" do not indicate a definite difference. For example, the first multicast service in this application may be replaced with the multicast service.

Figure 6A:
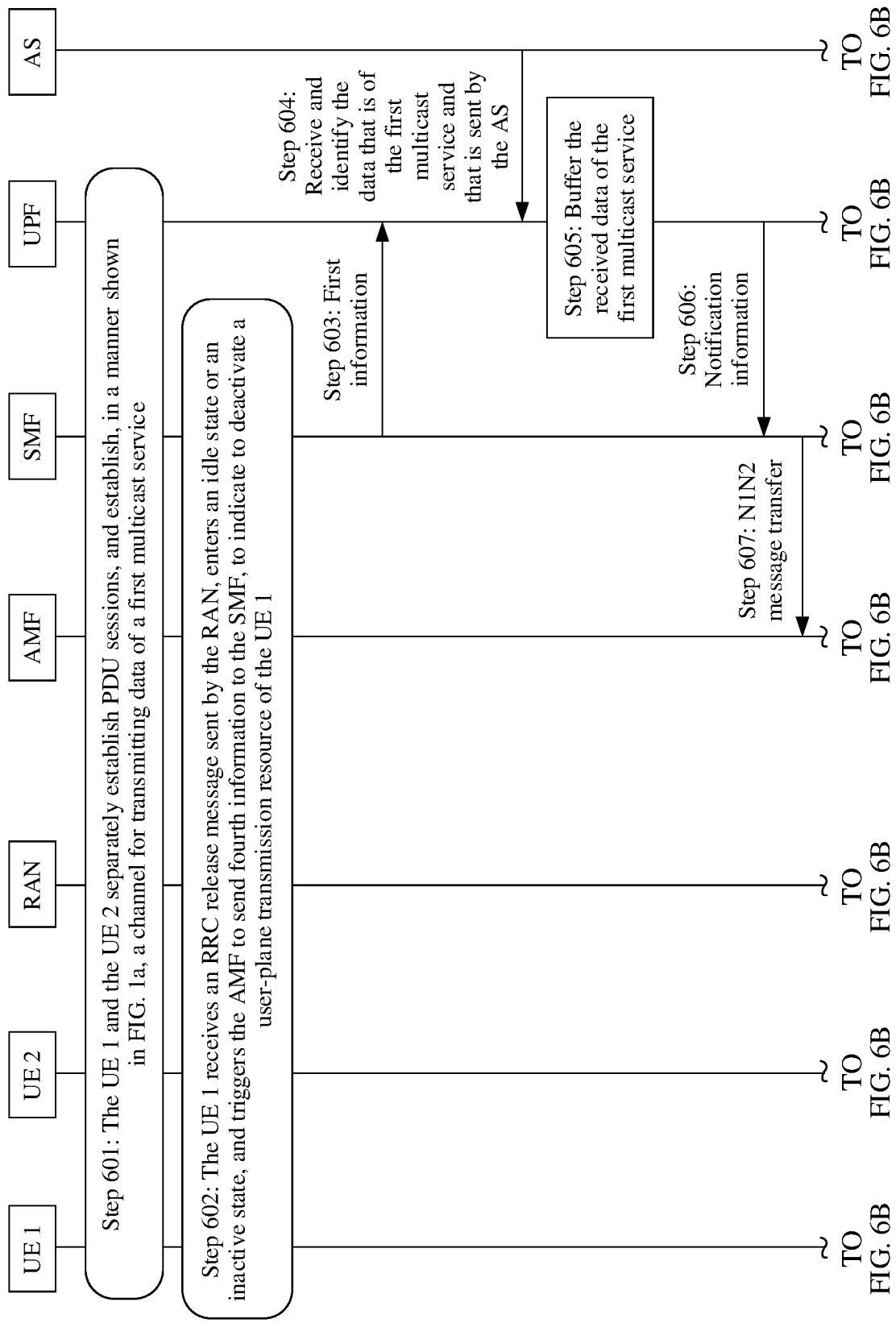

With reference to the communication system shown in FIG. 3b, the following describes in detail the method shown in FIG. 5 by using an example in which the session management network element is an SMF, the user plane network element is a UPF, the access network device is a RAN, the terminals in the multicast group share a same UPF, and the multicast group includes a plurality of UEs such as UE 1 and UE 2. FIG. 6A and FIG. 6B are a flowchart of a data transmission method according to an embodiment of this application. As shown in FIG. 6A and FIG. 6B, the method may include the following steps.

Step 601: UE 1 and UE 2 separately establish PDU sessions. After the UE 1 and the UE 2 establish the PDU sessions, the UE 1 and the UE 2 further trigger, by using a PDU session modification request or a join request that is sent by a user plane for joining a multicast group corresponding to a first multicast service, an SMF to establish, in a manner shown in FIG. 1a, a channel for transmitting data of the first multicast service and select a QF corresponding to a PDU session of either the UE 1 or the UE 2 as a QF for transmitting the data of the first multicast service, for example, select a QF corresponding to the PDU session of the UE 2 as the QF for transmitting the data of the first multicast service. Alternatively, the SMF provides, to a RAN, related information about joining of the UE 1 and the UE 2, and triggers the RAN to establish a dedicated channel of the multicast group, where the dedicated channel of the multicast group includes the QF for transmitting the data of the first multicast service.

For a process in which the UE 1 and the UE 2 establish the PDU sessions, refer to a conventional technology. Details are not described.

Further, after the session management network element selects the QF for transmitting the data of the first multicast service, the SMF may configure the UPF to store a correspondence between downlink tunnel information of the RAN and a QFI, a correspondence between the QFI and identification information of the multicast service, or the like. Further, the SMF further stores a context of the multicast group, where the context of the multicast group includes a correspondence among identification information of UE in the multicast group, identification information of the UPF, and the identification information of the multicast service.

Step 602: The UE 1 receives an RRC release message sent by the RAN, enters an idle state or an inactive state, and triggers an AMF to send fourth information to the SMF, to indicate to deactivate a user-plane transmission resource of the UE 1.

For an execution process of step 602, refer to FIG. 2. Details are not described again.

The UE 2 may be in an RRC connected state, and the user-plane transmission resource of the UE 2 may be in a deactivated state or an activated state. This is not limited.

Step 603: The SMF receives the fourth information, and sends first information to the UPF. Correspondingly, the UPF receives the first information.

For related descriptions of the first information, refer to step 501. The first information is used to configure the UPF to send notification information to the SMF when the data of the first multicast service arrives at the UPF. Further, the first information may further include indication information indicating the UPF to buffer the data of the first multicast service. Specifically, for a process in which the SMF sends the first information to the UPF, refer to step 501 in FIG. 5. This is not limited.

Step 604: The UPF receives and identifies the data that is of the first multicast service and that is sent by the AS.

Step 605: The UPF buffers the received data of the first multicast service based on the first information received in step 603.

Alternatively, step 605 may be the UPF sends the received data of the first multicast service or discards the received data of the first multicast service based on the first information received in step 603.

Step 606: The UPF sends the notification information to the SMF.

For a related description of the notification information and a process in which the UPF sends the notification information to the SMF, refer to the embodiment corresponding to FIG. 5. Details are not described again.

Step 607: The SMF receives the notification information, finds the UE 1 based on the notification information, and sends, to the AMF corresponding to the UE 1, an N1N2 message transfer message that carries the second information. Correspondingly, the AMF receives the N1N2 message transfer message.

For a related description of the second information and a process in which the SMF sends, to the AMF corresponding to the UE 1, the N1N2 message transfer message that carries the second information, refer to the embodiment corresponding to FIG. 5. Details are not described again.

It should be noted that, if there are a plurality of UEs in a preset state in the multicast group, and the plurality of UEs correspond to one or more AMFs, the SMF may separately send an N11 message to the one or more AMFs. One AMF corresponds to one N11 message, and one N11 message includes identification information of PDU sessions of all UEs in a preset state that correspond to the AMF. Alternatively, one AMF corresponds to a plurality of N11 messages, and one N11 message includes identification information of PDU sessions of a plurality of UEs in a preset state that correspond to the AMF. This is not limited.

Further, if the UE 1 is in the idle state, step 608 to step 615 are performed, to end the procedure, and if the UE 1 is in the inactive state, step 6i0 to step 615 are performed, to end the procedure.

Step 608: The AMF determines that the UE 1 is in the idle state, and the AMF sends a paging message to the UE 1 through the RAN.

The paging message may be for paging the UE 1. The paging message may include identification information of the UE 1 and the like.

Step 609: The UE 1 receives the paging message, and sends a service request message to the AMF. Correspondingly, the AMF receives the service request message.

The service request message may request a network side to establish a context of the UE, and establish a CM connection between the RAN and the network side. The service request message may include a security parameter, the identification information of the UE, and the like.

Step 610: The AMF sends fifth information to the RAN.

The fifth information carries N2 SM information. For a related description of the fifth information, refer to FIG. 5. Details are not described again.

Step 611: The RAN receives the fifth information, and establishes a communication connection between the RAN and the UE 1 based on the fifth information.

Specifically, for step 611, refer to step 506. Details are not described again.

Step 612: The RAN sends first indication information to the AMF, and the AMF receives the first indication information, and sends second indication information to the SMF based on the first indication information.

The first indication information and the second indication information may indicate that establishment of the communication connection between the RAN and the UE 1 is completed.

Similarly, if establishment of a communication connection between the UE and another RAN served by the AMF is completed, indication information may also be sent to the SMF with reference to the process shown in step 612. The indication information may indicate that establishment of all communication connections between the RAN and UEs in the multicast group that correspond the AMF is completed. It should be noted that, after receiving indication information returned by all RANs that receive the N2 SM information and indicating that establishment of all communication connections is completed, the AMF sends, to the SMF, fifth indication information indicating that establishment of all communication connections that the SMF requests the AMF to trigger is completed. Alternatively, the AMF sets a timer, where duration of the timer is the second preset waiting duration. After the timer expires, the AMF sends, to the SMF, fifth indication information indicating that establishment of all communication connections that the SMF requests the AMF to trigger is completed.

Further, if a transmission tunnel between the RAN and the UPF is released, and the N2 SM information further carries a multicast session tunnel establishment request or indication, the RAN may further send the downlink tunnel information of the RAN to the SMF through the AMF, so that the SMF sends the downlink tunnel information of the RAN to the UPF. The UPF sends the data of the first multicast service to the RAN based on the downlink tunnel information of the RAN, and the RAN sends the data to the UE in the multicast group.

Step 613: The SMF receives the second indication information, and sends an N4 message to the UPF after establishment of communication connections between the access network device and all UEs in the multicast group or at least one UE in a preset state is completed or after first preset waiting duration, where the N4 message carries third information.

The third information may indicate the UPF to send the data of the first multicast service. The N4 message may further include the identification information of the first multicast service, the downlink tunnel information of the RAN, and the like.

It should be noted that, after receiving the indication information returned by all the AMFs that receive the N1N2 message transfer message, the SMF sends the N4 message to the UPF, or sets a timer. Duration of the timer is the first preset waiting duration. After the timer expires, the SMF sends, to the UPF, the N4 message carrying the third information. This is not limited.

Step 614: The UPF receives the N4 message, and sends the buffered data of the first multicast service based on the N4 message.

It should be noted that step 614 is optional. Step 614 is performed only if the first information sent by the SMF to the UPF in step 605 includes information indicating the UPF to buffer the data of the first multicast service.

Step 615: The RAN receives the data of the first multicast service, and sends the data of the first multicast service.

Based on the method shown in FIG. 6A and FIG. 6B, the SMF indicates the UPF to buffer the data of the first multicast service, so that when some UEs in the multicast group are in an inactive state, the UPF can buffer the data of the first multicast service in time, and the UPF sends the data of the first multicast service only when all UEs in the multicast group are in a connected state. This can ensure that all the UEs can receive the data of the first multicast service without loss.

In the method shown in FIG. 5 or FIG. 6B, the data transmission method provided in this embodiment of this application is described by using an example in which the user plane network element buffers, when there is a terminal in the preset state in the multicast group, the data of the first multicast service under an indication of the session management network element, triggers paging of the terminal in the preset state, and establishes a communication connection between the terminal and the access network device, and then when establishment of the communication connection between the terminal in the preset state in the multicast group and the access network device is completed, the session management network element triggers the user plane network element to send the buffered data of the first multicast service. Alternatively, the RAN may receive and buffer the data of the first multicast service, page the terminal in the preset state, and send the buffered data of the first multicast service when the terminal in the preset state in the multicast group transits to the connected state and has established the communication connection to the access network device. For the method, refer to FIG. 7.

Figure 7:
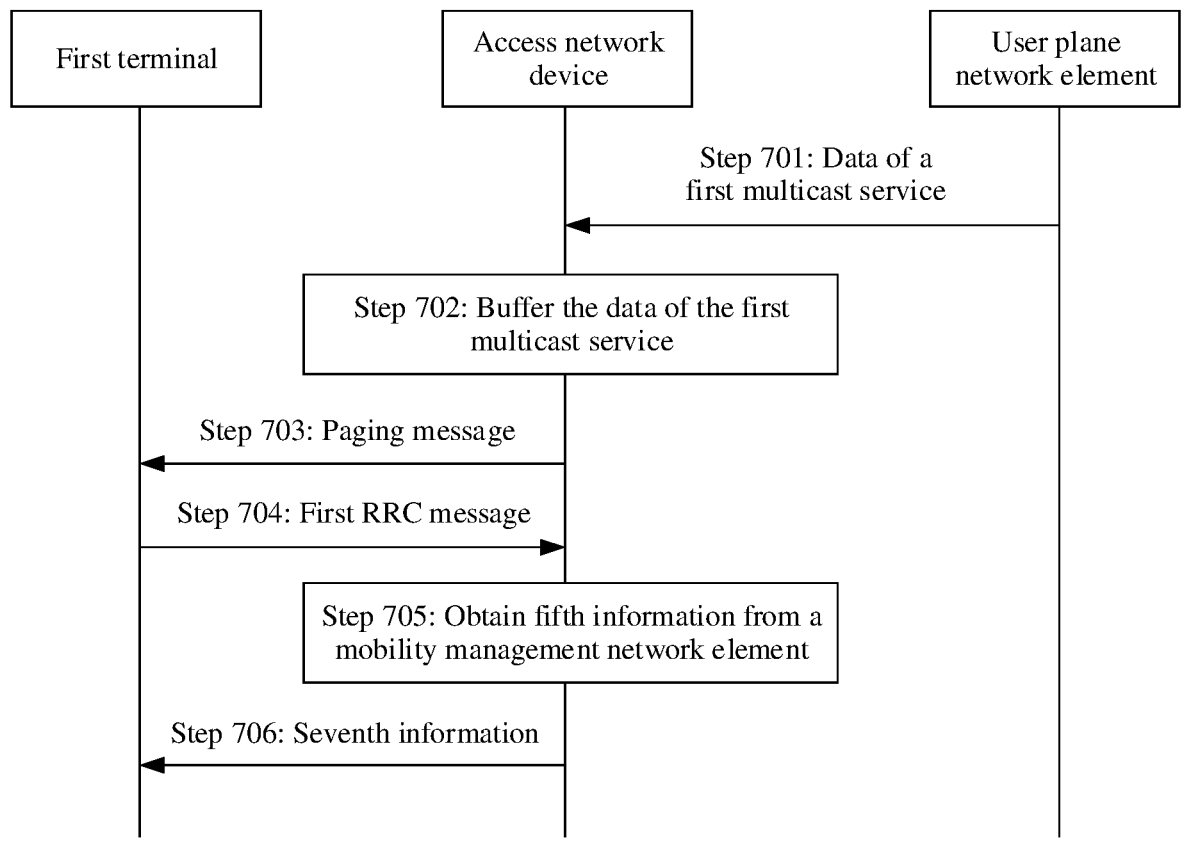
FIG. 7 is a flowchart of another data transmission method according to an embodiment of this application.

FIG. 7 is a flowchart of another data transmission method according to an embodiment of this application. As shown in FIG. 7, the method may include the following steps.

Step 701: A user plane network element sends data of a first multicast service to a first access network device. Correspondingly, the first access network device receives the data of the first multicast service.

For a related description of the first multicast service, refer to step 501. Details are not described again.

For example, the first access network device may receive, through a downlink transmission tunnel between the first access network device and the user plane network element, the data of the first multicast service from the user plane network element corresponding to the first multicast service.

Step 702: The first access network device buffers the data of the first multicast service when there is at least one terminal that is served by the first access network device and that is in a preset state in a multicast group corresponding to the first multicast service.

For example, the first access network device may determine, through the RRC connection release process shown in FIG. 2, whether a terminal that is served by the first access network device and that is in the multicast group corresponding to the first multicast service is in the preset state. For example, a first terminal is used as an example. After receiving an RRC release message from the first terminal, the first access network device determines, based on the RRC release message sent by the first terminal, that the first terminal is in the preset state, including an RRC_idle state or an RRC_inactive state.

Step 703: The first access network device sends a paging message to the first terminal. Correspondingly, the first terminal receives the paging message.

The paging message may be for paging the first terminal, so that the first terminal transits from the preset state to an RRC connected state, for example, transits from the idle state to the RRC connected state, or transits from the inactive state to the RRC connected state. The first terminal is included in the at least one terminal in the preset state. The paging message may include identification information of the first terminal. The identification information of the first terminal is described in the method shown in FIG. 5. Details are not described again.

For example, the first access network device may send the paging message to the first terminal on a first channel. The first channel may include any one of the following channels, including a unicast channel between the first access network device and the first terminal, a common channel, and a dedicated channel of the multicast group corresponding to the first multicast service.

Similarly, for another terminal in the preset state, the first access network device may also send a paging message to the another terminal. For example, the at least one terminal in the preset state further includes a second terminal, and the first access network device sends, to the second terminal, a paging message for paging the second terminal. The rest may be deduced by analogy until the first access network device pages all of the at least one terminal in the preset state. It should be noted that the first access network device may simultaneously or not simultaneously page the at least one terminal in the preset state. This is not limited.

Further optionally, the method shown in FIG. 7 may further include the following steps.

Step 704: The first terminal sends a first RRC message to the first access network device. Correspondingly, the first access network device receives the first RRC message from the first terminal.

The first RRC message may be request to establish a communication connection between the first terminal and the first access network device, and the communication connection may be for transmitting the data of the first multicast service. When the first terminal is in the idle state, the first RRC message is a service request message. When the first terminal is in the inactive state, the first RRC message may be an RRC resume request message.

Similarly, all terminals that receive the paging message sent by the first access network device may send a first RRC message to the first access network device based on step 704, to request the first access network device to establish communication connections to the terminals.

Step 705: The first access network device obtains fifth information from a mobility management network element based on the first RRC message.

The fifth information may be for establishing the communication connection between the first terminal and the first access network device. For a related description of the fifth information, refer to descriptions in step 505. Details are not described again.

For example, the fifth information may be N2 SM information. The first access network device may obtain the fifth information from the mobility management network element, and the mobility management network element may obtain the fifth information from a session management network element. That the mobility management network element obtains the fifth information from the session management network element may include the mobility management network element sends, to the session management network element, fourth information for deactivating a user-plane transmission resource of the first terminal, and the session management network element receives the fourth information from the mobility management network element, and sends, by using the fourth information as a trigger condition, the fifth information to the mobility management network element in response to the fourth information. Alternatively, the session management network element sends a subscription request to the mobility management network element based on the fourth information, where the subscription request is for requesting to subscribe to a first event, and the first event is that the first terminal transits from the preset state to the connected state. When the session management network element receives the first event notified by the mobility management network element, the session management network element sends the fifth information to the mobility management network element.

For a related description of the fourth information, refer to the method shown in FIG. 5. Details are not described again.

Step 706: The first access network device sends seventh information to the first terminal based on the fifth information.

The seventh information indicates a related configuration of the communication connection between the first terminal and the first access network device, for example, an air interface resource/DRB that is configured for the first terminal and that is for transmitting the data of the first multicast service.

For example, after receiving the fifth information, the first access network device allocates, to the first terminal based on the N2 SM information carried in the fifth information, an air interface resource corresponding to the first multicast service. For example, the first access network device configures, based on a unicast QFI and QoS parameter information corresponding to the unicast QFI that are carried in the N2 SM information, a corresponding DRB for transmitting the data of the first multicast service in a unicast manner, configures, based on QoS parameter information corresponding to a multicast QFI, a corresponding DRB for transmitting the data of the first multicast service in a multicast manner, and sends related information of the configured DRBs to the first terminal through an RRC connection reconfiguration process or an RRC resume process, so that the first terminal can receive the data of the first multicast service on the DRBs. Further, if the fifth information carries the security configuration information, the first access network device sends the security configuration information to the first terminal.

In this way, establishment of the communication connection between the first access network device and the first terminal is completed.

Similarly, with reference to the foregoing process, another terminal may transit to the connected state, and a communication connection between another terminal in the preset state and the first access network device is established. Details are not described again.

Further, the first access network device sends the buffered data of the first multicast service when there is no terminal that is served by the first access network device and that is in the preset state in the multicast group corresponding to the first multicast service.

Alternatively, the first access network device sends the buffered data of the first multicast service based on third preset waiting duration. For example, a timer is set, and duration of the timer is equal to the third preset waiting duration. The first access network device starts the timer when starting to page the terminal. After running of the timer ends, the first access network device sends the buffered data of the first multicast service. In other words, the buffered data of the first multicast service is sent only after the timer expires, to reduce a packet loss problem of the terminal in the multicast group as much as possible.

For example, it is assumed that the first access network device serves a multicast group 1, there are 10 terminals in the multicast group, three terminals are in a connected state, and seven terminals are in an idle state. The seven terminals in the idle state have different speeds of transiting from the idle state to the connected state. In addition, the three terminals in the connected state do not need to be paged first, that is, the terminals are already in the connected state. Therefore, once an air interface resource is immediately allocated to a terminal in the connected state to send the buffered data of the first multicast service, if another terminal returns to the connected state at a low speed and is still in a process of returning to the connected state and establishing a communication connection, a packet loss problem of the another terminal for the data of the first multicast service is caused, affecting service experience of the another terminal in the multicast group. A purpose of setting a timer by the first access network device and sending the buffered data of the first multicast service after the timer expires is to enable most terminals in the multicast group to return to the connected state and establish communication connections as much as possible within duration of the timer, to reduce a packet loss problem of the terminal in the multicast group as much as possible.

Based on the method shown in FIG. 7, when there is the at least one terminal that is served by the first access network device and that is in the preset state in the multicast group corresponding to the first multicast service, after receiving the data of the multicast service, the first access network device is triggered to first buffer the data of the multicast service, then page the terminal so that the terminal is in the connected state, and send the buffered data of the multicast service when all terminals in the multicast group establish communication connections to the first access network device, to ensure that the terminals in the multicast group receive the data of the multicast service.

Figure 8A:
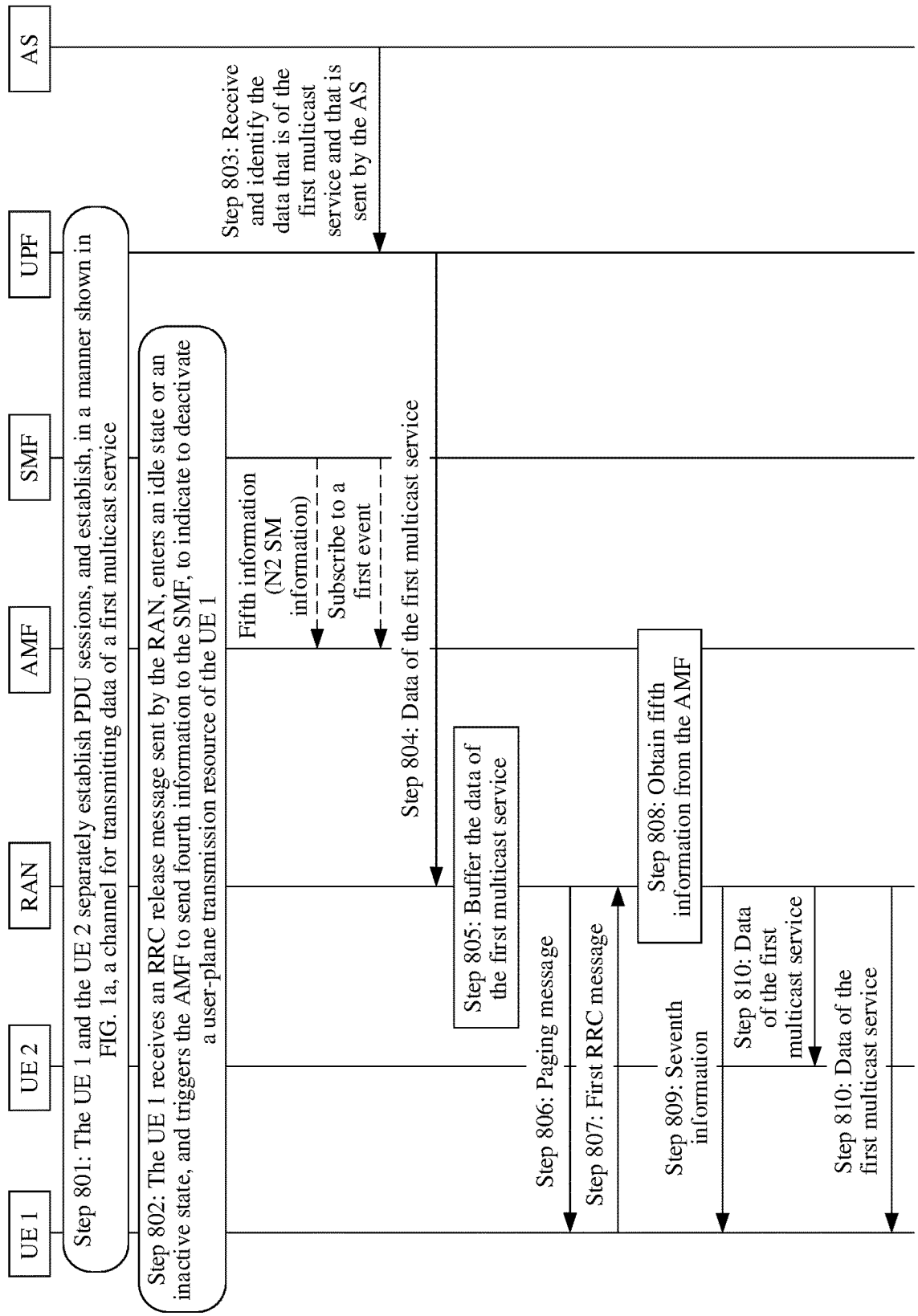
FIG. 8a is a flowchart of another data transmission method according to an embodiment of this application.

With reference to the communication system shown in FIG. 3b, the following describes the method shown in FIG. 7 in detail by using an example in which the session management network element is an SMF, the mobility management network element is an AMF, the user plane network element is a UPF, the first access network device is a RAN, the terminals in the multicast group share a same UPF, and UE 1 and UE 2 that correspond to/that are served by the RAN are in the multicast group corresponding to the first multicast service. FIG. 8a is a flowchart of another data transmission method according to an embodiment of this application. As shown in FIG. 8a, the method may include the following steps.

Step 801: UE 1 and UE 2 separately establish PDU sessions. After the UE 1 and the UE 2 establish the PDU sessions, the UE 1 and the UE 2 further trigger, by using a PDU session modification request or a join request that is sent by a user plane for joining a multicast group corresponding to a multicast service, an SMF to establish, in a manner shown in FIG. 1a, a channel for transmitting data of the first multicast service and select a QF corresponding to a PDU session of either the UE 1 or the UE 2 as a QF for transmitting the data of the first multicast service, for example, select a QF corresponding to the PDU session of the UE 2 as the QF for transmitting the data of the first multicast service.

For step 801, refer to step 601. Details are not described again.

Step 802: The UE 1 receives an RRC release message sent by a RAN, enters an idle state or an inactive state, and triggers an AMF to send fourth information to the SMF, to indicate to deactivate a user-plane transmission resource of the UE 1.

For step 802, refer to step 602. Details are not described again.

Further, after receiving the fourth information, the SMF may send fifth information to the AMF in response to the fourth information, and the AMF receives and stores the fifth information, or the SMF subscribes to a first event from the AMF, where the first event is that the UE 1 transits from a preset state to a connected state.

For related descriptions of the fourth information and the fifth information, refer to the embodiment corresponding to FIG. 5. Details are not described again.

Step 803: The UPF receives and identifies the data that is of the first multicast service and that is sent by an AS.

Step 804: The UPF sends the data of the first multicast service to the RAN.

Step 805: The RAN receives the data of the first multicast service, and buffers the data of the first multicast service.

For example, the RAN may learn, according to step 802, that the UE 1 in the preset state exists in the multicast group, and buffer the data of the first multicast service.

Step 806: The RAN sends a paging message to the UE 1.

Step 807: The UE 1 receives the paging message, and sends a first RRC message to the RAN.

The first RRC message may be a service request message or an RRC resume request message.

Step 808: The RAN receives the first RRC message, and obtains the fifth information from the AMF.

Specifically, for related descriptions of the fifth information, refer to the embodiment corresponding to FIG. 5. Details are not described again.

In an example, when the UE 1 enters the preset state in step 802, to be specific, when the SMF receives the fourth information sent by the AMF, the SMF is triggered to send the fifth information to the AMF in advance, and the AMF stores the fifth information. After receiving the first RRC message, the RAN is triggered to obtain the fifth information from the AMF.

In another example, after receiving the first RRC message, the RAN notifies the SMF of the first event through the AMF, and triggers the SMF to send the fifth information to the RAN through the AMF, so that the RAN determines the fifth information based on the fifth information.

Step 809: The RAN sends seventh information to the UE 1 based on the fifth information.

The seventh information indicates a related configuration of the communication connection between the UE1 and the first access network device, for example, an air interface resource/DRB that is configured for the UE1 and that is for transmitting the data of the first multicast service.

For step 809, refer to step 506. Details are not described again.

Step 810: The RAN determines that there is no UE that is served by the RAN and that is in the preset state in the multicast group corresponding to the first multicast service, and the RAN sends the data of the first multicast service to UE in the multicast group through a communication connection between the RAN and the UE in the multicast group.

Based on the method shown in FIG. 8a, when there is no UE that is served by the RAN and that is in the preset state in the multicast group corresponding to the first multicast service, the RAN buffers the data of the first multicast service in time. When there is no UE that is served by the RAN and that is in the preset state in the multicast group, the RAN sends the data of the first multicast service. This can ensure that UEs in all states can receive the data of the first multicast service without loss.

It should be understood that, to reduce signaling overheads, after receiving the notification information indicating that the user plane network element receives the data of the first multicast service, the session management network element may indicate, to the mobility management network element by using a signaling message, a terminal that joins the multicast group, so that the mobility management network element pages the terminal in the idle state to receive the data of the first multicast service. Specifically, for this method, refer to FIG. 8b.

Figure 8B:
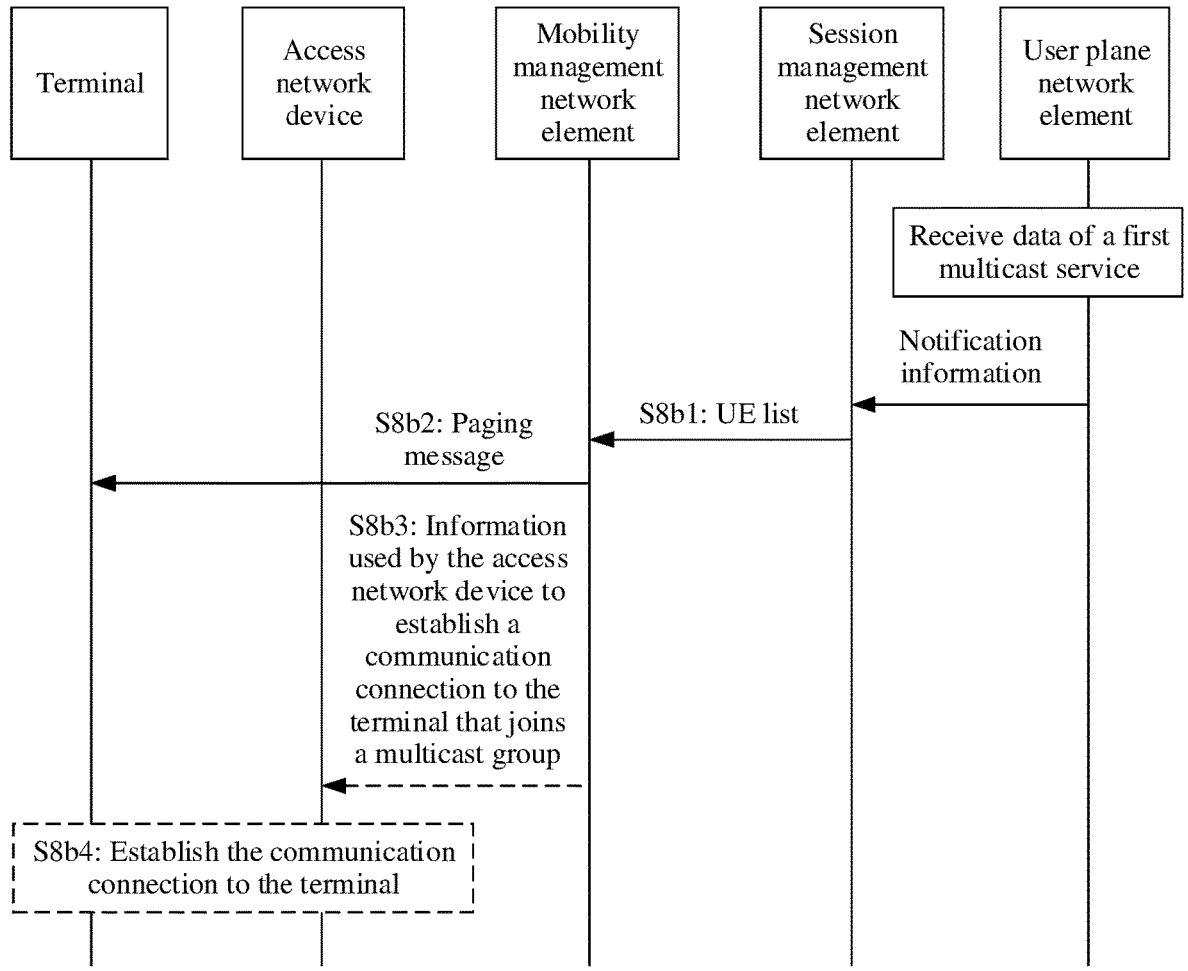
FIG. 8b is a flowchart of another data transmission method according to an embodiment of this application.

FIG. 8b shows another data transmission method according to an embodiment of this application. As shown in FIG. 8b, the method may include the following steps.

S8b1: A session management network element sends a UE list of a multicast group to a mobility management network element. Correspondingly, the mobility management network element receives the UE list of the multicast group.

The session management network element may be the SMF in FIG. 3b. The session management network element may manage a PDU session of a terminal, and the PDU session is associated with a multicast session corresponding to the multicast group. The mobility management network element may be the AMF in FIG. 3b, and a terminal joining the multicast group may perform network registration through the mobility management network element.

The UE list may indicate/correspond to the terminal joining the multicast group. It should be understood that the terminal joining the multicast group herein may include all terminals joining the multicast group, or may include some terminals in the terminals joining the multicast group, for example, may include a terminal joining the multicast group and in a preset state, or include a terminal meeting the following condition in terminals managed by the session management network element: joining the multicast group, joining the multicast group and in a preset state, or joining the multicast group and not establishing a communication connection for transmitting data of a first multicast service.

Specifically, the UE list may include identification information of a plurality of terminals that join the multicast group. It should be noted that the identification information, included in the UE list, of the plurality of terminals that join the multicast group may not be identification information of all terminals that join the multicast group in a network, but may be identification information of terminals that send a multicast group joining request to the session management network element. In other words, the UE list may correspond to identification information of terminals that join the multicast group that is stored by the session management network element. For example, the UE list may include identification information of a first terminal, identification information of a second terminal, and the like. The UE list may be carried in second information, the second information may be for triggering establishment of a communication connection between the terminal that joins the multicast group and the access network device, and the communication connection is for transmitting the data of the first multicast service. The second information may further carry identification information of the multicast group. Specifically, for a related description of the second information, refer to step 504.

For example, the session management network element may receive, from a user plane network element, notification information for notifying that the data of the first multicast service has been received, and send, to the mobility management network element based on the notification information, the second information that carries the UE list of the multicast group. Specifically, for an implementation process in which the session management network element sends the second information, refer to step 501 to step 504.

S8*b*2: The mobility management network element determines a terminal in an idle state in the terminals indicated by the UE list, and sends a paging message to the terminal in the idle state.

In S8*b*2, to ensure that the terminal can normally receive the data of the first multicast service through the communication connection, the corresponding terminal in the idle state (or referred to as a CM-IDLE state) further needs to be transited to a connected state (or referred to as CM-CONNECTED). In this application, the terminal in the idle state may be paged in a group paging manner. Specifically, the group paging manner may include the mobility management network element determines the terminal in the idle state in the terminals indicated by the UE list, obtains a registration area of the terminal in the idle state, obtains a first paging area through calculation based on the registration area of the terminal in the idle state, and sends, in the first paging area, the paging message carrying the identification information of the multicast group.

There may be one or more terminals in the idle state. That the mobility management network element determines the terminal in the idle state in the terminals indicated by the UE list may include the mobility management network element may search, by using identification information of a terminal as an index, for a context of the terminal stored by the mobility management network element, and determines that the terminal is in the idle state if status information of the terminal in the found context of the terminal indicates that the terminal is in the idle state (for example, the context of the terminal includes an idle radio network temporary identifier (I-RNTI)) or the context of the terminal does not include an AMF UE next generation application protocol identifier (AMF UE Next Generation Application Protocol ID, AMF UE NGAP ID).

In this embodiment of this application, the paging message may be for paging the terminal in the idle state. In the group paging manner, the paging message may carry the identification information of the multicast group. After the terminal that needs to receive the data of the first multicast service detects, on a paging channel, the paging message that carries the identification information of the multicast group, the terminal may transit from the idle state to a connected state.

For example, the terminal in the idle state includes the first terminal and the second terminal, and the mobility management network element may send, in the first paging area, the paging message that carries the identification information of the multicast group. Further, if the first terminal is successfully paged, the mobility management network element receives a service request message from the first terminal, and/or if the second terminal is successfully paged, the mobility management network element receives a service request message from the second terminal.

In this embodiment of this application, a registration area of each terminal may be configured by the mobility management network element, and allocated to the terminal in advance. The registration area of each terminal may include one or more cells, and the registration area of the terminal may include a signal area coverage area of one or more access network devices. For example, a registration area of the UE 1 may include signal area coverage areas of base stations in an area 1, an area 2, and an area 3.

The first paging area includes a registration area of the first terminal and a registration area of the second terminal, that is, includes a union set/a universal set of the registration area of the first terminal and the registration area of the second terminal. Optionally, to enable more terminals to receive the data of the first multicast service, the first paging area further includes a registration area of a terminal other than the first terminal and the second terminal in the UE list. Alternatively, the first paging area further includes a registration area of a terminal in an idle state other than the first terminal and the second terminal in the UE list. In this way, group paging can be initiated in registration areas of more terminals, so that more terminals are paged to receive the data of the first multicast service.

For example, the UE list includes UE 1 to UE 3, and a registration area is pre-allocated to the UE 1 and the UE 2 in an idle state. For example, the registration area of the UE 1 includes an area 1, an area 2, and an area 3, and the registration area of the UE 2 includes the area 2, the area 3, and an area 4. It is assumed that group paging is performed at a granularity of a plurality of UEs. Because the areas 2 and 3 in the registration area of the UE 1 overlap the areas 2 and 3 in the registration area of the UE 2, there is no overlapping area between the area 1 in the registration area of the UE 1 and the registration area of the UE 2, and there is no overlapping area between the area 4 in the registration area of the UE 2 and the registration area of the UE 1, in a paging cycle, the paging message carrying the identification information (for example, an MBS session ID) of the multicast group may be sent in the area 1, the area 2, the area 3, and the area 4. Compared with paging at a per UE granularity, this solution reduces paging signaling overheads. Alternatively, the paging message carrying the identification information (for example, an MBS session ID) of the multicast group is sent in the area 1, the area 2, the area 3, the area 4, and a registration area of the UE 3, so that more terminals can be paged, to receive the data of the first multicast service.

Further, optionally, for terminals that have not established communication connections to an access network device for transmitting the data of the first multicast service, to ensure normal transmission of the data of the first multicast service, the method further includes the following steps.

S8*b*3: The mobility management network element sends, to the access network device corresponding to the terminals, information used by the access network device to establish communication connections to the terminals that join the multicast group.

The access network device may include one or more access network devices that have not established communication connections for transmitting the data of the first multicast service. That the mobility management network element sends, to the access network device, information used by the access network device to establish communication connections to the terminals that join the multicast group may include the mobility management network element separately sends, to the one or more access network devices, the information for establishing the communication connections to the terminals.

For example, if the first terminal and the second terminal do not establish, to the access network device, communication connections for transmitting the data of the first multicast service, the first terminal corresponds to a first access network device, and the second terminal corresponds to a second access network device, the mobility management network element may separately send, to the first access network device, fifth information used by the first access network device to establish a communication connection to the first terminal, and to the second access network device, sixth information used by the second access network device to establish a communication connection to the second terminal. Specifically, for related descriptions and sending manners of the fifth information and the sixth information, refer to step 505. Details are not described again.

It should be understood that a time sequence in which the mobility management network element separately sends, to the access network device corresponding to the terminals, the information used by the access network device to establish the communication connections to the terminals that join the multicast group is not limited in this application. For example, the fifth information and the sixth information may be sent successively, or may be sent simultaneously. This is not limited.

S8b4: The access network device establishes the communication connections to the terminals based on the information used by the access network device to establish the communication connections to the terminals that join the multicast group.

Specifically, for S8b4, refer to the process in which the first access network device establishes the communication connection to the first terminal in step 506. Details are not described again.

Based on the method shown in FIG. 8b, group paging may be triggered in registration areas of a plurality of terminals by using one signaling message, to reduce paging signaling overheads. In addition, communication connections that are between the plurality of terminals and the access network device and that are for receiving data of a multicast service are established, to reduce signaling overheads.

The foregoing mainly describes the solutions provided in embodiments of this application from a perspective of interaction between nodes. It may be understood that, to implement the foregoing functions, the nodes such as the session management network element, the mobility management network element, the user plane network element, and the first access network device each include a corresponding hardware structure and/or software module for performing each function. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

In embodiments of this application, function module division may be performed on the session management network element, the mobility management network element, the user plane network element, the first access network device, and the like based on the foregoing method examples, for example, function modules may be divided based on functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 9:
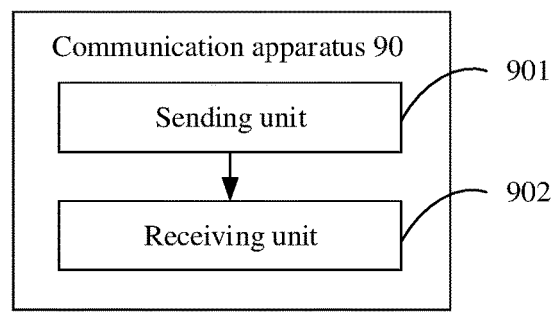
FIG. 9 is a schematic composition diagram of a communication apparatus 90 according to an embodiment of this application.

FIG. 9 is a schematic composition diagram of a communication apparatus 90 according to an embodiment of this application. The communication apparatus 90 may be a session management network element, or a chip or a system on a chip in the session management network element. In a possible design, as shown in FIG. 9, the communication apparatus 90 may include a sending unit 901 and a receiving unit 902.

The sending unit 901 is configured to send first information to a user plane network element when there is at least one terminal in a preset state in a multicast group corresponding to a first multicast service, where the first information is used by the user plane network element to send notification information to the session management network element when data of the first multicast service arrives at the user plane network element. For example, the sending unit 901 may be configured to support the communication apparatus 90 in performing step 501 and step 603.

The receiving unit 902 is configured to receive the notification information from the user plane network element, where the notification information indicates that the data of the first multicast service arrives at the user plane network element. For example, the receiving unit 902 is configured to support the communication apparatus 90 in performing step 504 and step 607.

The sending unit 901 is further configured to send second information to a mobility management network element based on the notification information, where the second information is for triggering establishment of a communication connection between a first terminal and a first access network device, and the first terminal belongs to the at least one terminal in the preset state. For example, the sending unit 901 is configured to support the communication apparatus 90 in performing step 504 and step 607.

Specifically, in the possible design, all related content of the steps related to the session management network element in the foregoing method embodiments in FIG. 5 and FIG. 6A and FIG. 6B may be cited in function descriptions of the corresponding function modules. Details are not described herein again. The communication apparatus 90 in the possible design is configured to perform functions of the session management network element in the data transmission methods shown in FIG. 5 and FIG. 6A and FIG. 6B, and therefore can achieve an effect the same as that achieved by the foregoing data transmission methods.

It should be noted that, in another possible implementation, the communication apparatus 90 shown in FIG. 9 may include a processing module and a communication module. Functions of the sending unit 901 and the receiving unit 902 may be integrated into the communication module. The processing module is configured to control and manage an action of the communication apparatus 90. For example, the processing module is configured to support the communication apparatus 90 in performing another process of the technology described in this specification. The communication module is configured to support the communication apparatus 90 in performing step 501, step 504, step 607, and the like, and communicating with another network entity. Further, the communication apparatus 90 shown in FIG. 9 may further include a storage module, configured to store program code and data of the communication apparatus 90.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communication module may be a transceiver circuit, a communication interface, or the like. The storage module may be a memory. When the processing module is a processor, the communication module is a communication interface, and the storage module is a memory, the communication apparatus 90 shown in FIG. 9 may be the communication apparatus 400 shown in FIG. 4.

Figure 10:
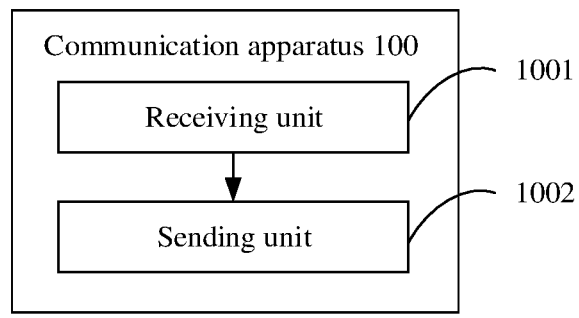
FIG. 10 is a schematic composition diagram of a communication apparatus 100 according to an embodiment of this application.

FIG. 10 is a schematic composition diagram of a communication apparatus 100 according to an embodiment of this application. The communication apparatus 100 may be a user plane network element, or a chip or a system on a chip in the user plane network element. As shown in FIG. 10, the communication apparatus 100 may include a receiving unit 1001 and a sending unit 1002.

The receiving unit 1001 is configured to receive first information from a session management network element, where the first information is used by the user plane network element to send notification information to the session management network element when data of a first multicast service arrives at the user plane network element, and receive the data of the first multicast service. For example, the receiving unit 1001 is configured to support the communication apparatus 100 in performing step 502 and step 603.

The sending unit 1002 is configured to send the notification information to the session management network element based on the first information, where the notification information indicates that the data of the first multicast service arrives at the user plane network element. For example, the sending unit 1002 is configured to support the communication apparatus 100 in performing step 502, step 605, and step 606.

Specifically, in the possible design, all related content of the steps related to the user plane network element in the foregoing method embodiments in FIG. 5 and FIG. 6A and FIG. 6B may be cited in function descriptions of the corresponding function modules. Details are not described herein again. The communication apparatus 100 in the possible design is configured to perform functions of the user plane network element in the data transmission methods shown in FIG. 5 and FIG. 6A and FIG. 6B, and therefore can achieve an effect the same as that achieved by the foregoing data transmission methods.

It should be noted that, in another possible implementation, the communication apparatus 100 shown in FIG. 10 may include a processing module and a communication module. Functions of the receiving unit 1001 and the sending unit 1002 may be integrated into the communication module. The processing module is configured to control and manage an action of the communication apparatus 100. For example, the processing module is configured to support the communication apparatus 100 in performing another process of the technology described in this specification. The communication module is configured to support the communication apparatus 100 in performing step 502, step 605, step 606, and the like, and communicating with another network entity. Further, the communication apparatus 100 shown in FIG. 10 may further include a storage module, configured to store program code and data of the communication apparatus 100. When the processing module is a processor, the communication module is a communication interface, and the storage module is a memory, the communication apparatus 100 shown in FIG. 10 may be the communication apparatus 400 shown in FIG. 4.

Figure 11:
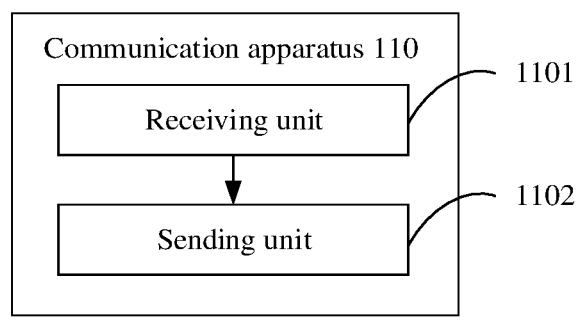
FIG. 11 is a schematic composition diagram of a communication apparatus 110 according to an embodiment of this application.

FIG. 11 is a schematic composition diagram of a communication apparatus 110 according to an embodiment of this application. The communication apparatus 110 may be a mobility management network element, or a chip or a system on a chip in the mobility management network element. As shown in FIG. 11, the communication apparatus 110 may include a receiving unit 1101 and a sending unit 1102.

The receiving unit 1101 is configured to receive second information from a session management network element, where the second information is for triggering establishment of a communication connection between a first terminal and a first access network device, and the communication connection is for transmitting data of a first multicast service. For example, the receiving unit 1101 is configured to support the communication apparatus 110 in performing step 505 and step 607.

The sending unit 1102 is configured to send fifth information to the first access network device based on the second information, where the fifth information is used by the first access network device to establish the communication connection to the first terminal. For example, the sending unit 1102 is configured to support the communication apparatus 110 in performing step 505 and step 610.

In another possible design, the receiving unit 1101 is configured to receive a user equipment list UE list of a multicast group from the session management network element, where the multicast group corresponds to the first multicast service, and the UE list indicates a terminal that joins the multicast group. For example, the receiving unit 1101 is configured to support the communication apparatus 110 in performing S8*b*1.

The sending unit 1102 is configured to send a paging message to a terminal in an idle state in the terminal indicated by the UE list. For example, the sending unit 1102 is configured to support the communication apparatus 110 in performing S8*b*2.

Specifically, in the possible design, all related content of the steps related to the mobility management network element in the foregoing method embodiments in FIG. 5, FIG. 6A and FIG. 6B, and FIG. 8*b* may be cited in function descriptions of the corresponding function modules. Details are not described herein again. The communication apparatus 110 in the possible design is configured to perform functions of the mobility management network element in the data transmission methods shown in FIG. 5, FIG. 6A and FIG. 6B, and FIG. 8*b*, and therefore can achieve an effect the same as that achieved by the foregoing data transmission methods.

It should be noted that, in another possible implementation, the communication apparatus 110 shown in FIG. 11 may include a processing module and a communication module. Functions of the receiving unit 1101 and the sending unit 1102 may be integrated into the communication module. The processing module is configured to support the communication apparatus 110 in controlling and managing an action of the communication apparatus 110. The communication module is configured to support the communication apparatus 110 in performing step 505, step 607, step 610, S8*b*1, S8*b*2, and the like, and communicating with another network entity. Further, the communication apparatus 110 shown in FIG. 11 may further include a storage module, configured to store program code and data of the communication apparatus 110. When the processing module is a processor, the communication module is a communication interface, and the storage module is a memory, the communication apparatus 110 shown in FIG. 11 may be the communication apparatus 400 shown in FIG. 4.

Figure 12:
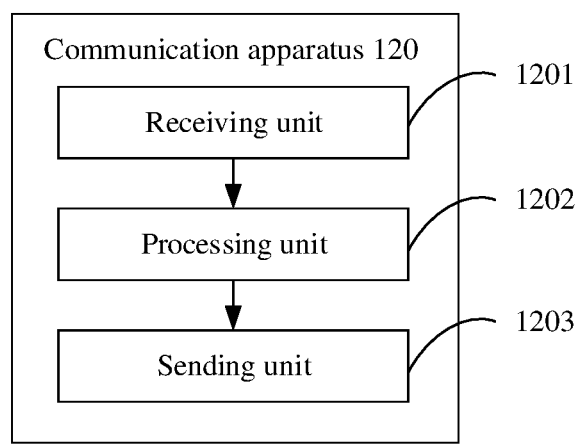
FIG. 12 is a schematic composition diagram of a communication apparatus 120 according to an embodiment of this application.

FIG. 12 is a schematic composition diagram of a communication apparatus 120 according to an embodiment of this application. The communication apparatus 120 may be a first access network device or a chip or a system-on-a-chip in the first access network device. As shown in FIG. 12, the communication apparatus 120 may include a receiving unit 1201, a processing unit 1202, and a sending unit 1203.

The receiving unit 1201 is configured to receive data of a first multicast service. For example, the receiving unit 1201 may support the communication apparatus 120 in performing step 701 and step 805.

The processing unit 1202 is configured to buffer the data of the first multicast service when there is at least one terminal that is in a preset state and that is served by the first access network device in a multicast group corresponding to the first multicast service. For example, the processing unit 1202 may support the communication apparatus 120 in performing step 702 and step 805.

The sending unit 1203 is configured to send a paging message for paging a first terminal, where the first terminal belongs to the at least one terminal that is in the preset state and that is served by the first access network device. For example, the sending unit 1203 may support the communication apparatus 120 in performing step 703 and step 806.

Further, the receiving unit 1201 may be further configured to receive an RRC message from the first terminal, where the RRC message is for requesting to establish a communication connection between the first terminal and the first access network device, and the communication connection is for transmitting the data of the first multicast service. For example, the receiving unit 1201 may support the communication apparatus 120 in performing step 704 and step 808.

The sending unit 1203 may be further configured to send seventh information to the first terminal. For example, the sending unit 1203 may support the communication apparatus 120 in performing step 705 and step 809.

Specifically, in the possible design, all related content of the steps related to the first access network device in the foregoing method embodiments in FIG. 7 to FIG. 8*b* may be cited in function descriptions of the corresponding function modules. Details are not described herein again. The communication apparatus 120 in the possible design is configured to perform functions of the first access network device in the data transmission methods shown in FIG. 7 to FIG. 8*b*, and therefore can achieve an effect the same as that achieved by the foregoing data transmission methods.

It should be noted that, in another possible implementation, the communication apparatus 120 shown in FIG. 12 may include a processing module and a communication module. The processing module may integrate a function of the processing unit 1202, and the communication module may integrate functions of the receiving unit 1201 and the sending unit 1203. The processing module is configured to support the communication apparatus 120 in performing step 702 and step 805 and controlling and managing an action of the communication apparatus 120. The communication module is configured to support the communication apparatus 120 in performing step 701, step 805, step 703, step 806, step 705, step 809, and the like, and communicating with another network entity. Further, the communication apparatus 120 shown in FIG. 12 may further include a storage module, configured to store program code and data of the communication apparatus 120. When the processing module is the processor, the communication module is the communication interface, and the storage module is the memory, the communication apparatus 120 shown in FIG. 12 may be the communication apparatus 400 shown in FIG. 4.

Figure 13:
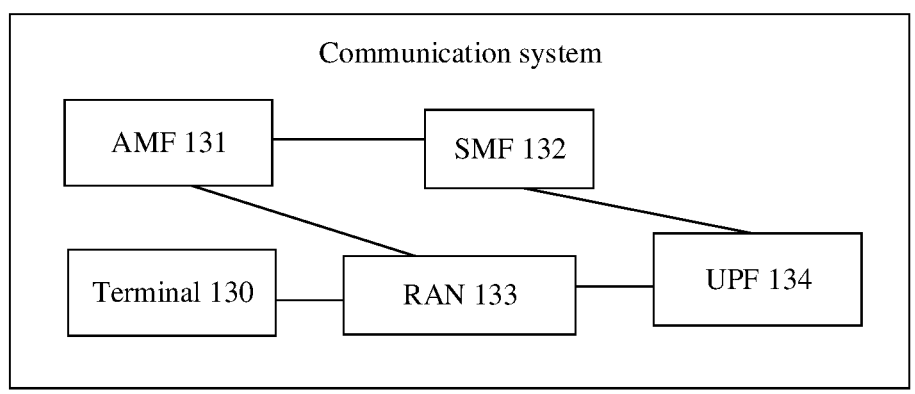
FIG. 13 is a schematic composition diagram of a communication system according to an embodiment of this application.

FIG. 13 is a schematic composition diagram of a communication system according to an embodiment of this application. As shown in FIG. 13, the communication system may include a terminal 130, an AMF 131, an SMF 132, a RAN 133, and a UPF 134.

A function of the SMF 132 is the same as a function of the communication apparatus 90. A function of the UPF 134 is the same as a function of the communication apparatus 100. A function of the AMF 131 is the same as a function of the communication apparatus 110. A function of the RAN 133 is the same as a function of the communication apparatus 120.

For example, in a possible design, the SMF 132 is configured to send first information to the UPF 134 when there is at least one terminal 130 in a preset state in a multicast group corresponding to a first multicast service, where the UPF 134 is an anchor corresponding to the first multicast service, and the first information indicates the UPF 134 to send notification information to the session management network element when data of the first multicast service arrives at the user plane network element.

The UPF 134 is configured to receive the first information from the SMF 132. When the data of the first multicast service arrives at the UPF 134, the UPF 134 sends the notification information to the SMF 132, where the notification information indicates that the data of the first multicast service arrives at the UPF 134.

The SMF 132 is further configured to receive the notification information returned by the UPF 134, and send second information to the AMF 131 based on the notification information, where the second information is for triggering establishment of a communication connection between a first terminal 130 and the RAN 133, and the first terminal 130 is a terminal that is included in the at least one terminal 130 in the preset state and that is managed by the AMF 131.

The AMF 131 is configured to receive the second information from the SMF 132, and send fifth information to the RAN 133 based on the second information, where the second information is for triggering establishment of the communication connection between the first terminal 130 and the RAN 133, and the fifth information indicates the RAN 133 to establish the communication connection between the RAN 133 and the first terminal 130.

In a possible design, the RAN 133 is configured to receive data of a first multicast service, buffer the data of the first multicast service when there is at least one terminal 130 that is served by the RAN 133 and that is in a preset state in a multicast group corresponding to the first multicast service, and send, to a first terminal 130, a paging message for paging the first terminal 130.

In another possible design, the SMF 132 is configured to send a UE list of a multicast group to the AMF 131, where the multicast group corresponds to the first multicast service, and the UE list indicates a terminal that joins the multicast group.

The AMF 131 is configured to receive the user equipment list UE list of the multicast group from the SMF 132, where the multicast group corresponds to the first multicast service, and send a paging message to a terminal in an idle state in the terminal indicated by the UE list.

Specifically, for an execution process of each network element in FIG. 13, refer to the execution steps of the corresponding network element in the foregoing methods in FIG. 5 to FIG. 8b. Details are not described herein.

An embodiment of this application further provides a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal apparatus according to any one of the foregoing embodiments, for example, including a data transmit end and/or a data receive end. For example, the computer-readable storage medium may be a hard disk or a memory of the terminal apparatus. Alternatively, the computer-readable storage medium may be an external storage device of the terminal apparatus, for example, a plug-in hard disk, a smart media card (SMC), a secure digital (SD) card, or a flash card that is configured on the terminal apparatus. Further, the computer-readable storage medium may include both an internal storage unit and an external storage device of the terminal apparatus. The computer-readable storage medium is configured to store the computer program and other programs and data that are required by the terminal apparatus. The computer-readable storage medium may be further configured to temporarily store data that has been output or is to be output.

An embodiment of this application further provides computer instructions. All or some of the procedures in the foregoing method embodiments may be implemented by the computer instructions instructing related hardware (such as a computer, a processor, a network device, and a terminal). The program may be stored in the foregoing computer-readable storage medium.

It should be understood that in embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transmission" refers to bidirectional transmission, and includes a sending action and/or a receiving action. Specifically, "transmission" in embodiments of this application includes data sending, data receiving, or data sending and data receiving. In other words, the data transmission herein includes uplink and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communication system is a communication network.

In the descriptions of this application, "/" represents an "or" relationship between associated objects unless otherwise specified. For example, A/B may represent A or B. A term "and/or" in this application represents only an association relationship between associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, in embodiments of this application, a word such as "example" or "for example" is used to represent giving an example, an illustration, or a description. Any embodiment or design scheme described as an "example" or with "for example" in embodiments of this application should not be explained as being more preferred or having more advantages than another embodiment or design scheme. Exactly, use of the word such as "example" or "for example" is intended to present a relative concept in a specific manner for ease of understanding.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may be one or more physical units, to be specific, may be located in one place, or may be distributed at a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device, where for example, the device may be a single-chip microcomputer or a chip, or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
    receiving, by a mobility management network element, second information from a session management network element, wherein the second information is associated with triggering establishment of a communication connection between a first terminal and a first access network device, and wherein the communication connection is associated with transmitting data of a first multicast service,
    wherein the first terminal is a member of a multicast group corresponding to the first multicast service, and a first status of the first terminal is an idle state,
    wherein the second information comprises a temporary mobile group identity (TMGI) of the multicast group corresponding to the first multicast service, and
    wherein the second information further comprises identification of a list of terminals that are members of the multicast group corresponding to the first multicast service; and
    sending, by the mobility management network element, fifth information to the first access network device based on the second information, wherein the fifth information causes the first access network device to establish the communication connection to the first terminal according to the fifth information.

2. The method according to claim 1, wherein the second information comprises first identification information of the first terminal.

3. The method according to claim 2, wherein the second information further comprises third identification information of a third terminal, the third terminal is a member of the multicast group corresponding to the first multicast service, a third status of the third terminal is the idle state, and the second information further triggers establishment of a third communication connection between the third terminal and the first access network device.

4. The method according to claim 3, wherein the fifth information is further for establishing the third communication connection between the third terminal and the first access network device.

5. The method according to claim 1, wherein the fifth information comprises service identification information of the first multicast service.

6. The method according to claim 5, wherein the service identification information of the first multicast service comprises a TMGI of the multicast group corresponding to the first multicast service.

7. The method according to claim 1, wherein the second information comprises identification information of a plurality of terminals, the plurality of terminals comprises the first terminal, and the method further comprises:
    based on statuses of the plurality of terminals being idle states, obtaining, by the mobility management network element, a paging area based on a union set of registration areas of the plurality of terminals, the first access network device corresponding to the paging area.

8. The method according to claim 7, wherein the method further comprises:
    searching, by the mobility management network element, a correspondence between terminal identification information and a terminal status for statuses of the plurality of terminals by using the identification information of the plurality of terminals as an index.

9. The method according to claim 1,
    wherein the second information further comprises identification information of a protocol data unit (PDU) session of the first terminal, and
    wherein all of the list of terminals identified by the second information are in the idle state.

10. The method according to claim 1,
    wherein the second information is received in response to notification that data of the first multicast service has arrived at a user plane network element, and
    wherein the user plane network element buffers the data of the first multicast service until the communication connection is established, the method further comprising:
    receiving, by the mobility management network element from the first access network device, first indication information, wherein the first indication information indicates that the establishment of the communication connection between the first terminal and the first access network device is completed; and
    sending, by the mobility management network element to the session management network element, second indication information based on the first indication information, wherein the second indication information triggers the session management network element to send third information to the user plane network element, the third information notifying the user plane network element to send the buffered data of the first multicast service to the first terminal through the communication connection.

11. A system, comprising:
    a mobility management network element; and
    a session management network element, wherein the session management network element is configured to:
        send second information to the mobility management network element, the second information triggering establishment of a communication connection between a first terminal and a first access network device, and the communication connection is associated with transmitting data of a first multicast service,
        wherein the first terminal is a member of a multicast group corresponding to the first multicast service, and a first status of the first terminal is an idle state, wherein the second information comprises a temporary mobile group identity (TMGI) of the multicast group corresponding to the first multicast service, and wherein the second information further comprises identification of a list of terminals that are members of the multicast group corresponding to the first multicast service; and the mobility management network element is configured to:

receive the second information, and send fifth information to the first access network device based on the second information, wherein the fifth information causes the first access network device to establish the communication connection to the first terminal.

12. The system according to claim 11, wherein the second information comprises identification information of a plurality of terminals, the plurality of terminals comprises the first terminal, and the mobility management network element is further configured to:

based on statuses of the plurality of terminals being idle states, obtain a paging area based on a union set of registration areas of the plurality of terminals, the first access network device corresponding to the paging area.

13. An apparatus, comprising:

one or more processors; and a non-transitory computer readable storage medium storing programming, the programming including instructions that, when executed by the one or more processors, cause the apparatus to perform operations including:

receiving second information from a session management network element, wherein the second information is for triggering establishment of a communication connection between a first terminal and a first access network device, and wherein the communication connection is associated with transmitting data of a first multicast service, wherein the first terminal is a member of a multicast group corresponding to the first multicast service, and a first status of the first terminal is an idle state, wherein the second information comprises a temporary mobile group identity (TMGI) of the multicast group corresponding to the first multicast service, and wherein the second information further comprises identification of a list of terminals that are members of the multicast group corresponding to the first multicast service; and sending fifth information to the first access network device based on the second information, wherein the fifth information causes the first access network device to establish the communication connection to the first terminal.

14. The apparatus according to claim 13, wherein the second information comprises first identification information of the first terminal.

15. The apparatus according to claim 14, wherein the fifth information is further for establishing the communication connection between a third terminal and the first access network device.

16. The apparatus according to claim 13, wherein the second information comprises identification information of a plurality of terminals, the plurality of terminals comprises the first terminal, and the operations further comprising:

based on statuses of the plurality of terminals being idle states, obtain a paging area based on a union set of registration areas of the plurality of terminals, the first access network device corresponding to the paging area.

\* \* \* \* \*